United States Patent
Adachi

(10) Patent No.: US 12,284,571 B2
(45) Date of Patent: Apr. 22, 2025

(54) WIRELESS COMMUNICATION DEVICE

(71) Applicant: SAMSUNG ELECTRONICS CO., LTD., Suwon-si (KR)

(72) Inventor: Tomoko Adachi, Kanagawa (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 20 days.

(21) Appl. No.: 18/299,579

(22) Filed: Apr. 12, 2023

(65) Prior Publication Data

US 2023/0254667 A1  Aug. 10, 2023

Related U.S. Application Data

(63) Continuation of application No. 17/952,945, filed on Sep. 26, 2022, now abandoned, which is a (Continued)

(30) Foreign Application Priority Data

Aug. 29, 2014  (JP) .................... 2014-175991

(51) Int. Cl.
  *H04W 4/06*  (2009.01)
  *H04B 7/0452*  (2017.01)
  (Continued)

(52) U.S. Cl.
  CPC ............. *H04W 4/06* (2013.01); *H04L 5/0055* (2013.01); *H04L 27/2601* (2013.01); (Continued)

(58) Field of Classification Search
  CPC ....... H04W 4/06; H04W 16/28; H04W 28/06; H04W 74/0816; H04W 84/12;
  (Continued)

(56) References Cited

U.S. PATENT DOCUMENTS 8,503,357 B2   8/2013  Matsuo et al.
9,179,449 B2  11/2015  Asterjadhi et al.
(Continued)

FOREIGN PATENT DOCUMENTS

JP   2013-526153 A   6/2013
JP   2013-532921 A   8/2013
(Continued)

OTHER PUBLICATIONS

IEEE doc.: IEEE 802.11-yy/xxxxr0; Title: UL MU-MIMO for 11ac; Author: Nee et al., Jul. 2009. (Year: 2009).*
(Continued)

*Primary Examiner* — Mohammed S Chowdhury
(74) *Attorney, Agent, or Firm* — BROADVIEW IP LAW, PC

(57) ABSTRACT

According to one embodiment, a wireless communication device, includes: a receiver configured to receive a first frame a transmitter address of which is an address of a first wireless communication device and a receiver address of which is an address of the wireless communication device; and a transmitter configured to transmit a second frame generated using a first address process in response to receipt of the first frame. The first address process is a process to set a first value in a first region in a receiver address field of the second frame. The first value is a value different from values settable in first regions in addresses of the first wireless communication device and another wireless communication device capable of receiving the second frame.

14 Claims, 19 Drawing Sheets

Related U.S. Application Data continuation of application No. 17/074,806, filed on Oct. 20, 2020, now Pat. No. 11,457,333, which is a continuation of application No. 15/444,939, filed on Feb. 28, 2017, now Pat. No. 10,827,313, which is a continuation of application No. PCT/JP2015/074784, filed on Aug. 31, 2015.

(51) Int. Cl.

| | | |
|---|---|---|
| *H04L 5/00* | (2006.01) | |
| *H04L 27/26* | (2006.01) | |
| *H04W 16/28* | (2009.01) | |
| *H04W 28/06* | (2009.01) | |
| *H04W 74/0816* | (2024.01) | |
| *H04W 84/12* | (2009.01) | |

(52) U.S. Cl.
CPC ........... *H04W 16/28* (2013.01); *H04W 28/06* (2013.01); *H04W 74/0816* (2013.01); *H04W 84/12* (2013.01); *H04B 7/0452* (2013.01); *H04L 5/0025* (2013.01)

(58) Field of Classification Search
CPC . H04L 5/0055; H04L 27/2601; H04L 5/0025; H04B 7/0452
See application file for complete search history.

(56) References Cited

U.S. PATENT DOCUMENTS

| | | | |
|---|---|---|---|
| 9,414,400 B2 | 8/2016 | Liang et al. | |
| 9,585,043 B2 | 2/2017 | Grandhi | |
| 9,661,634 B2 | 5/2017 | Wentink et al. | |
| 9,681,467 B2 | 6/2017 | Yang et al. | |
| 9,699,734 B2 | 7/2017 | Seok et al. | |
| 9,923,678 B2 | 3/2018 | Abeysekera et al. | |
| 2008/0119130 A1 | 5/2008 | Sinha | |
| 2011/0261708 A1 | 10/2011 | Grandhi | |
| 2012/0020243 A1 | 1/2012 | Gong | |
| 2012/0087358 A1 | 4/2012 | Zhu et al. | |
| 2012/0106426 A1 | 5/2012 | Hart et al. | |
| 2012/0263091 A1 | 10/2012 | Kim et al. | |
| 2012/0327838 A1 | 12/2012 | Seok | |
| 2014/0036772 A1 | 2/2014 | Asterjadhi et al. | |
| 2014/0307602 A1 | 10/2014 | Seok | |
| 2015/0049686 A1 | 2/2015 | Liang et al. | |
| 2015/0131627 A1 | 5/2015 | Wentink | |
| 2015/0288501 A1* | 10/2015 | Kwon .................. | H04L 1/1614 370/329 |
| 2015/0312386 A1 | 10/2015 | Lee et al. | |
| 2016/0028452 A1* | 1/2016 | Chu .......................... | H04L 1/16 375/267 |
| 2016/0029373 A1 | 1/2016 | Seok | |
| 2016/0113036 A1 | 4/2016 | Stephens et al. | |
| 2016/0142185 A1* | 5/2016 | Merlin ................. | H04L 12/189 370/312 |
| 2016/0262184 A1 | 9/2016 | Wentink | |
| 2017/0064583 A1* | 3/2017 | Roy .................. | H04W 36/0009 |
| 2017/0171878 A1* | 6/2017 | Chun .................... | H04B 7/0452 |
| 2017/0195991 A1 | 7/2017 | Ahn et al. | |
| 2017/0202026 A1* | 7/2017 | Ahn .................... | H04W 74/006 |
| 2017/0208627 A1 | 7/2017 | You et al. | |
| 2017/0280462 A1* | 9/2017 | Chun .................... | H04W 84/04 |
| 2017/0295041 A1 | 10/2017 | Yu et al. | |
| 2022/0264696 A1* | 8/2022 | Bao ....................... | H04W 76/28 |

FOREIGN PATENT DOCUMENTS

| | | |
|---|---|---|
| JP | 2013-219687 A | 10/2013 |
| JP | 2015-513862 A | 5/2015 |
| WO | WO-2013/132328 A1 | 9/2013 |
| WO | WO-2013/170200 A1 | 11/2013 |
| WO | WO-2014/014084 A1 | 1/2014 |

OTHER PUBLICATIONS

English translation of the International Preliminary Report on Patentability issued in Applicant's International Application PCT/JP2015/074784.

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.

Stacey, Robert: "Specification Framework for TGax", IEEE 11-15-0132-07-00ax-spec-framework, Intel, Jul. 2015, pp. 1-13.

Stacey, Robert: "Specification Framework for TGax", IEEE 11-15-0132-17-00ax-spec-framework, Intel, May 2016, pp. 1-61.

Tran Thi Thao Nguyen et al., "Uplink Multi-User MAC Protocol for 11ax", IEEE 11-14/0598r0, IEEE Mentor, Kyushu Institute of Technology, May 2014, pp. 1-19.

* cited by examiner

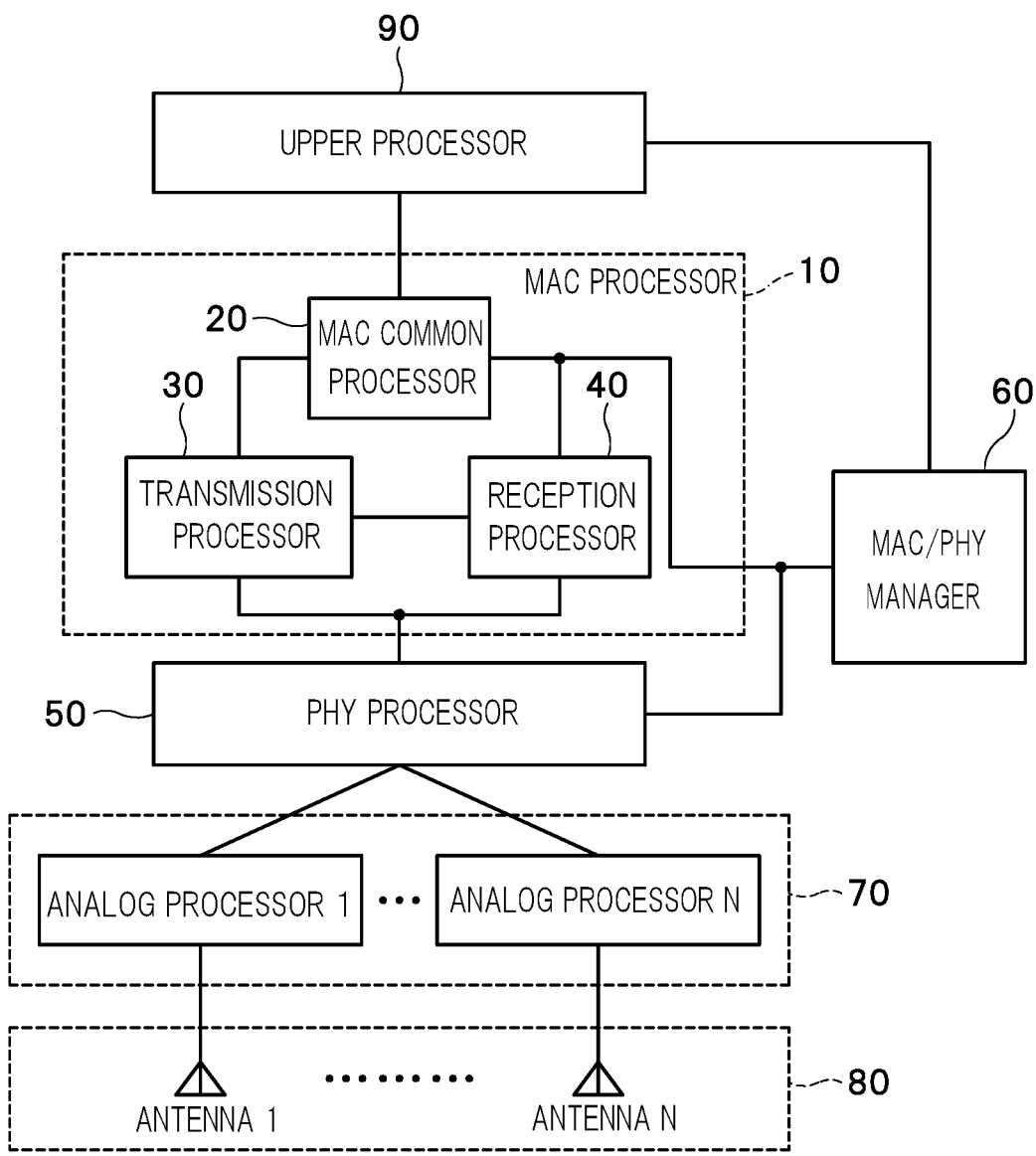
F I G. 1

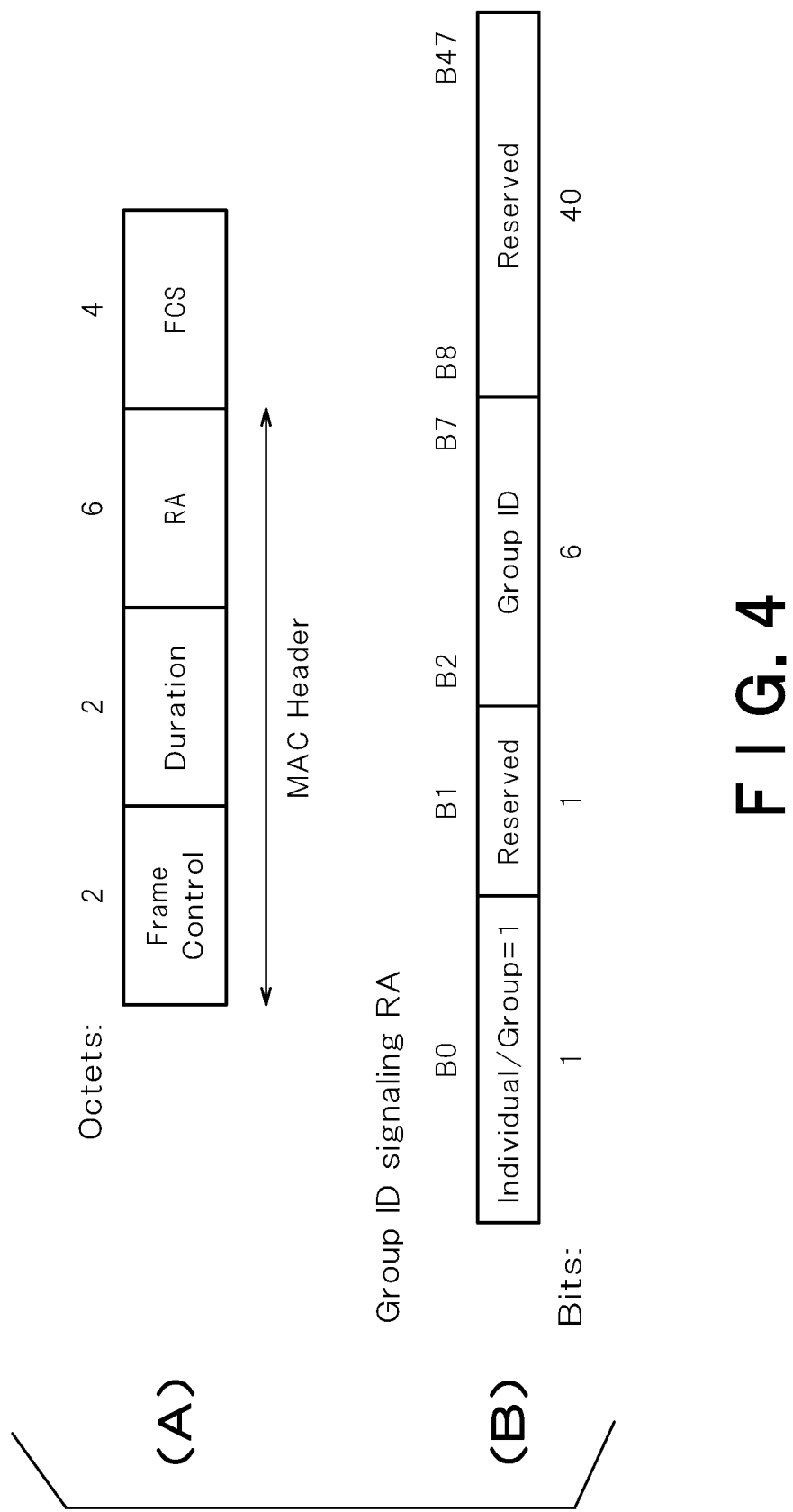
F I G. 4

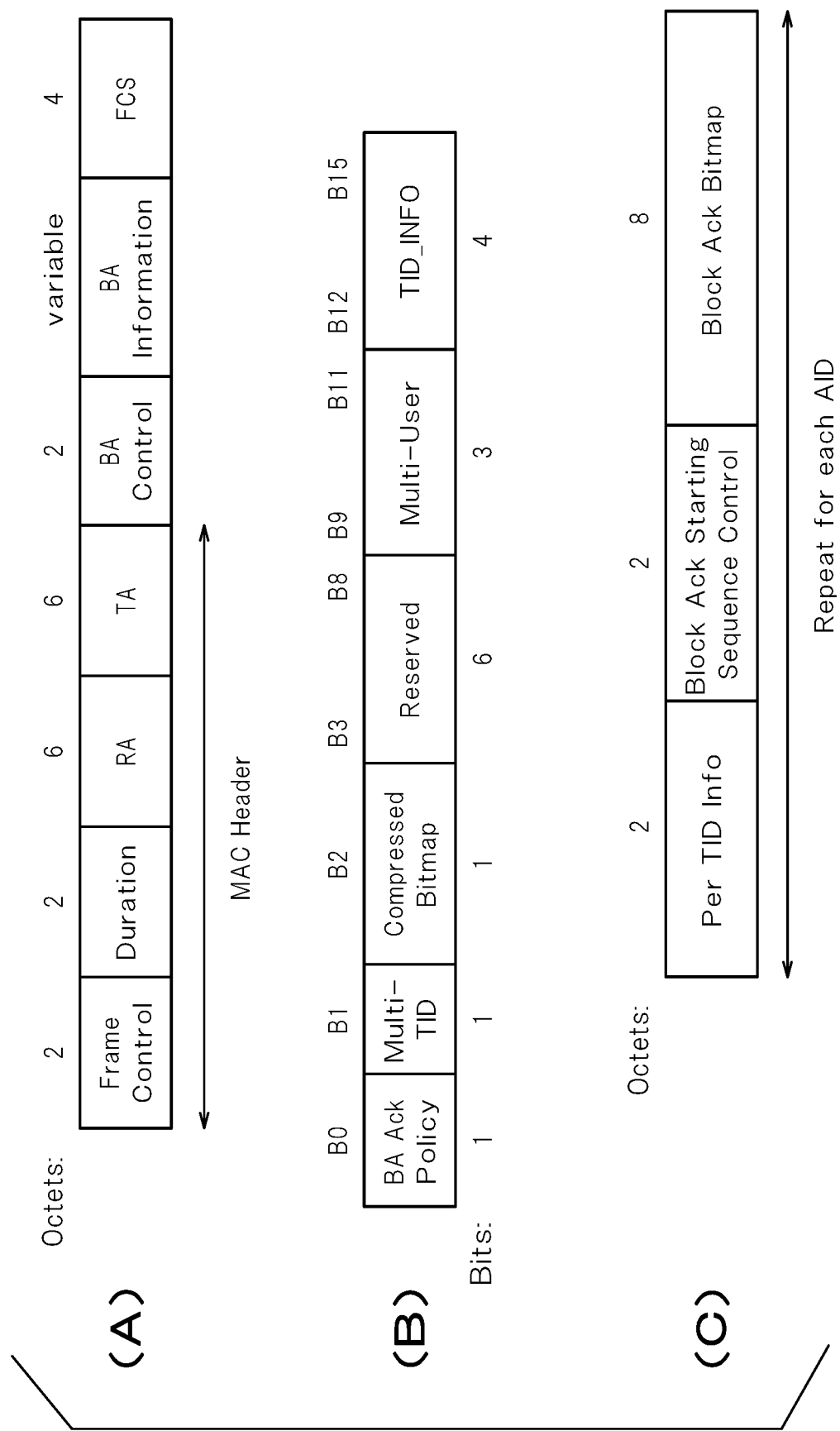
F I G. 5

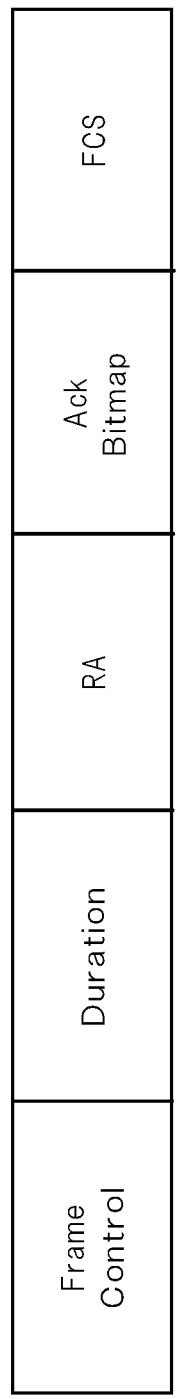
F I G. 6

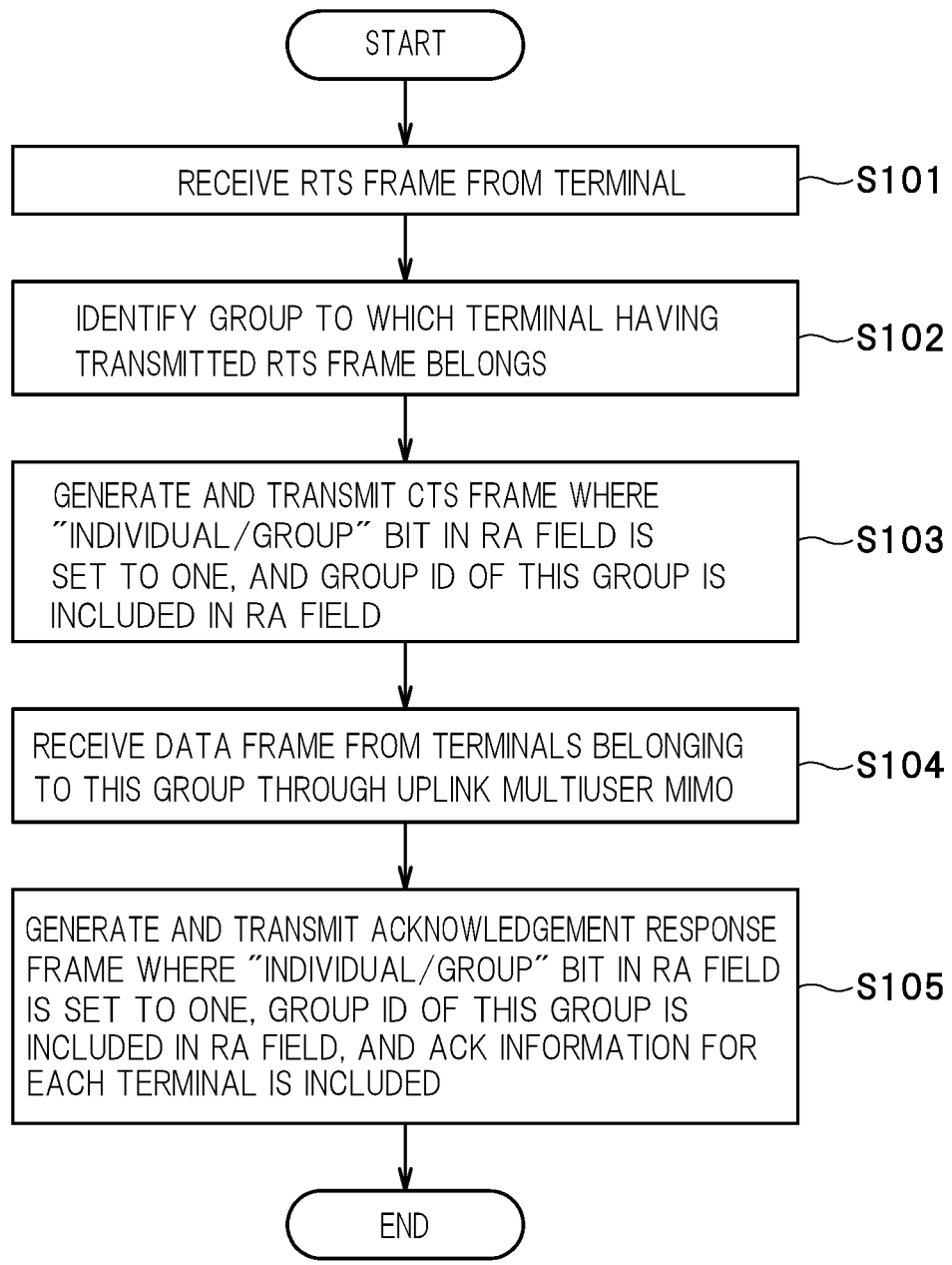
F I G. 8

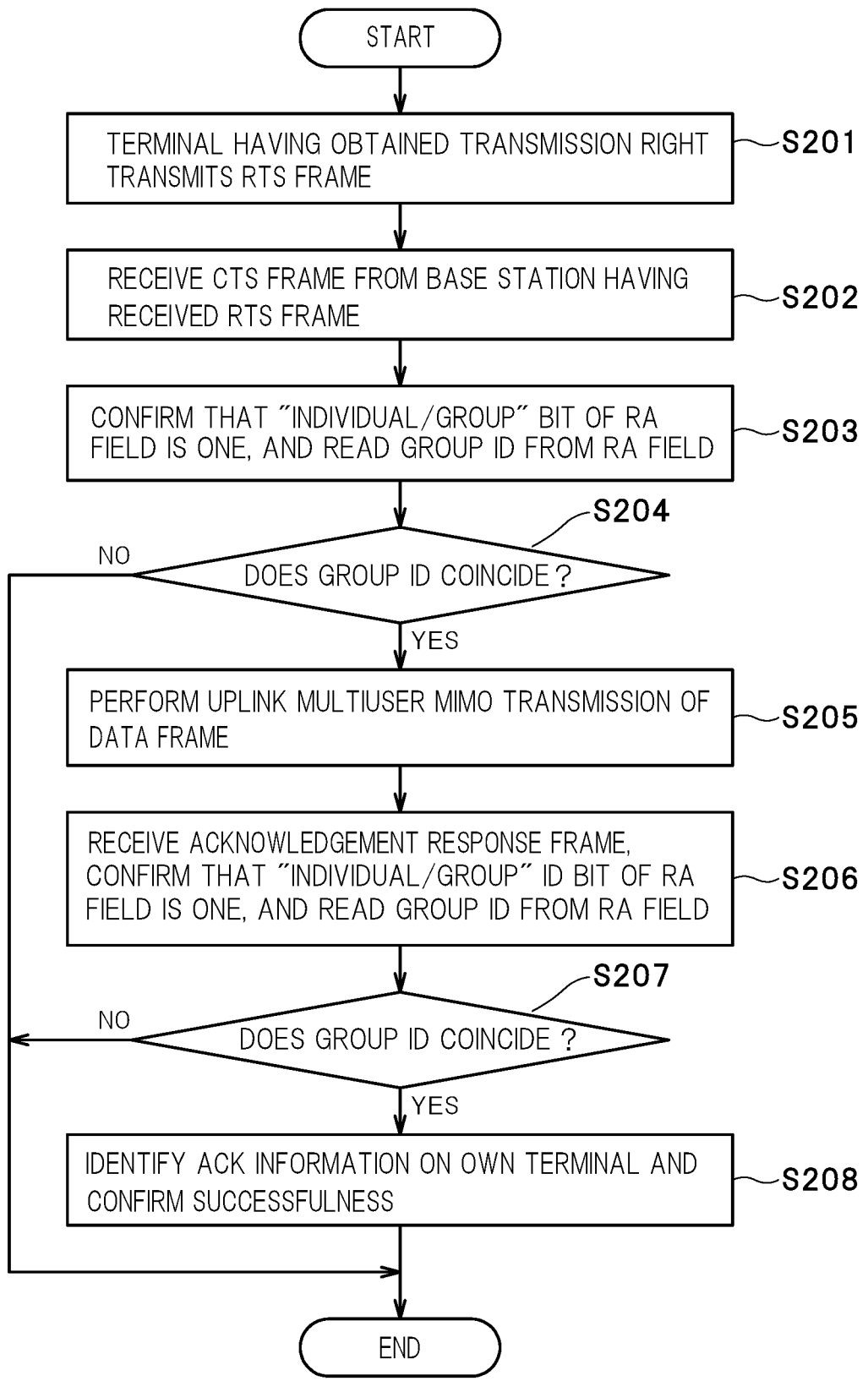
F I G. 9

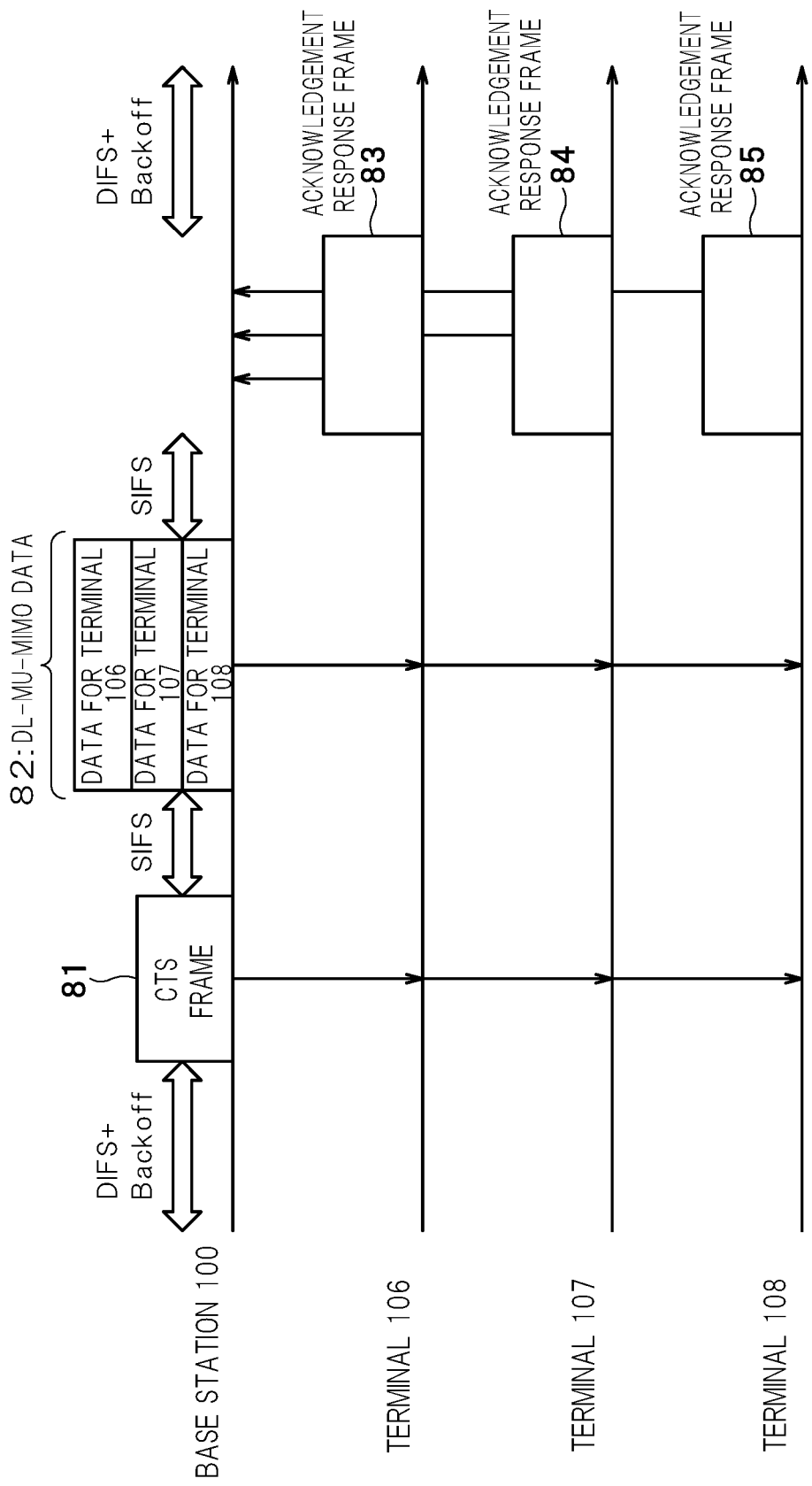
F I G. 10

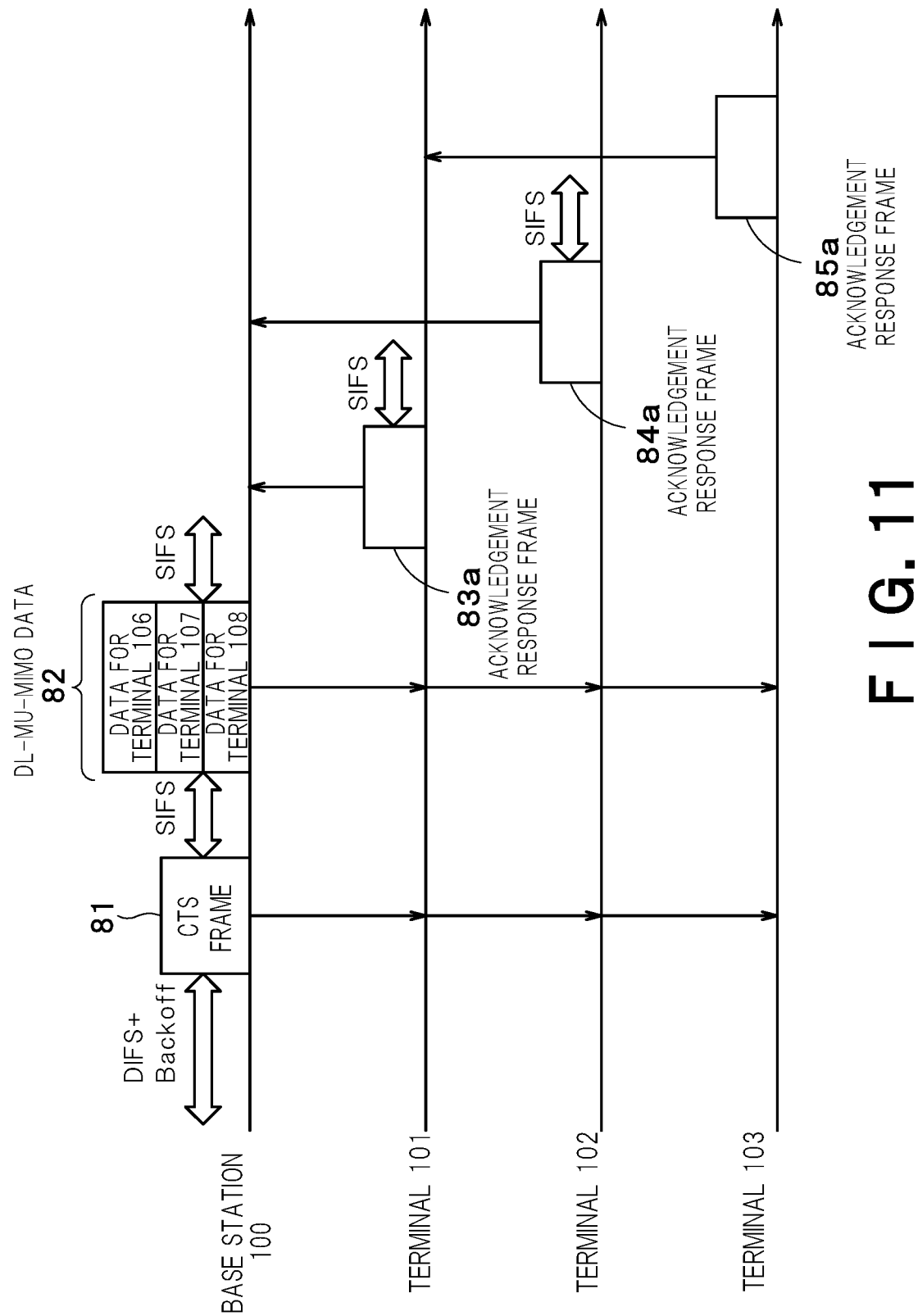
F I G. 11

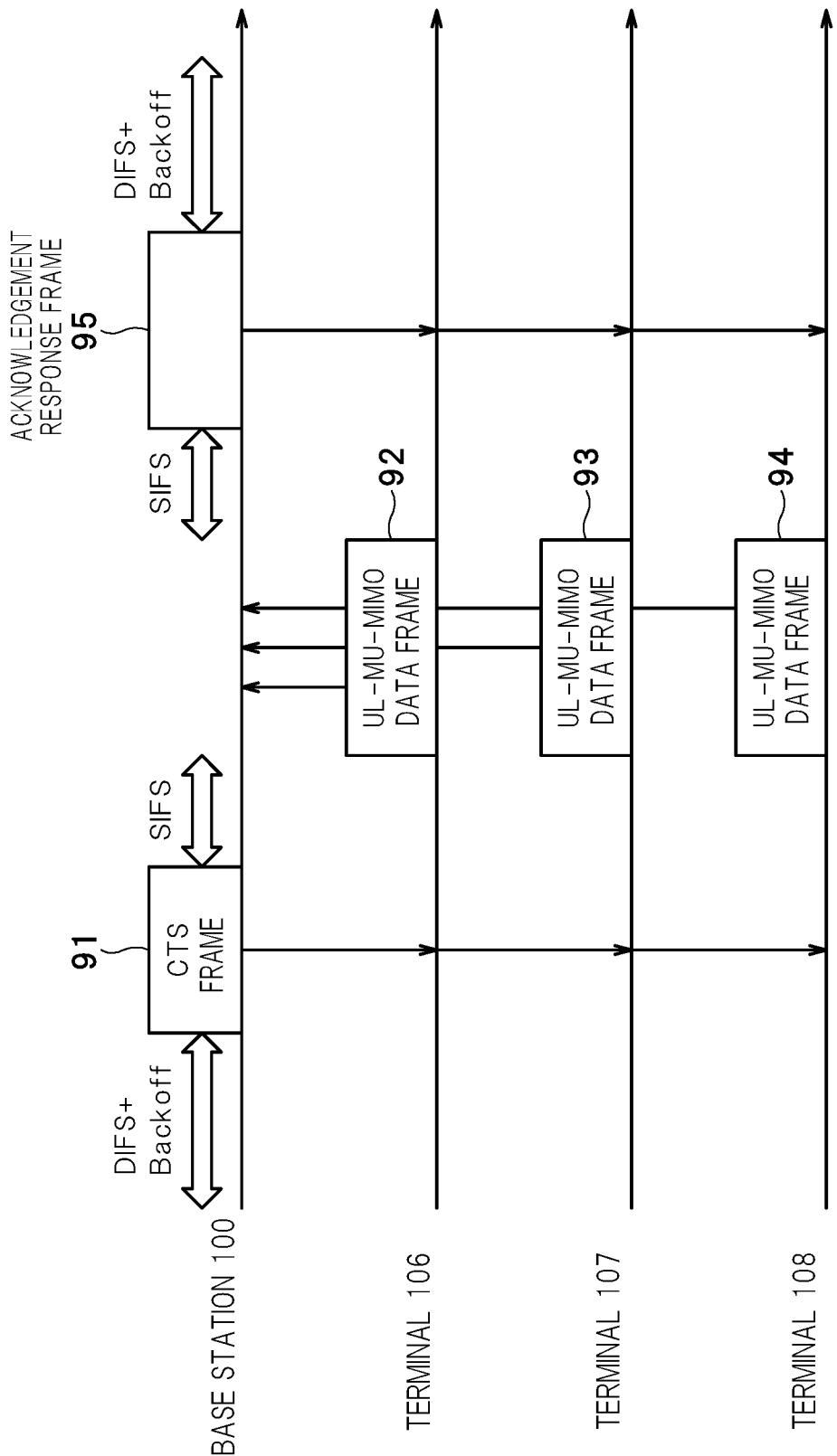
F I G. 12

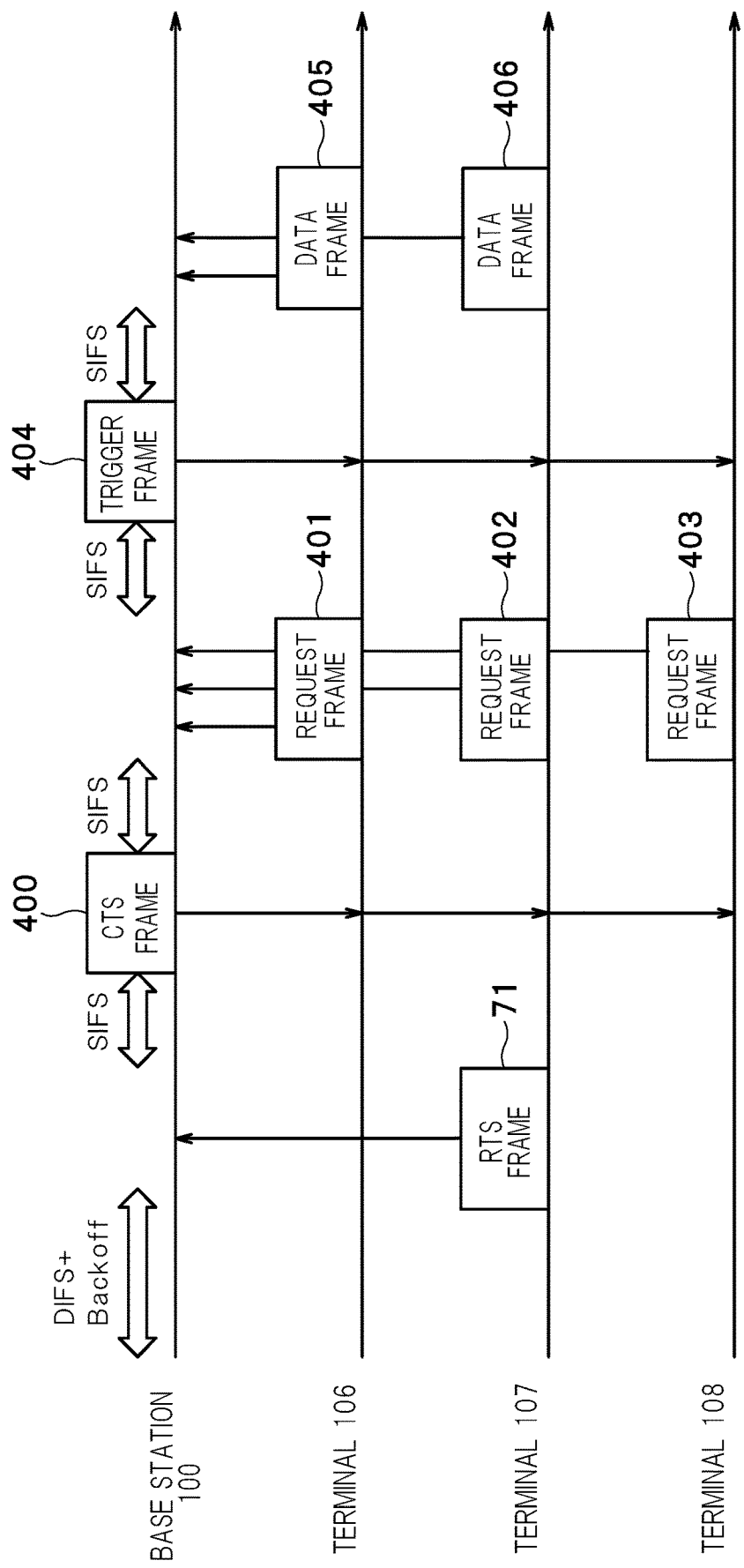
F I G. 13

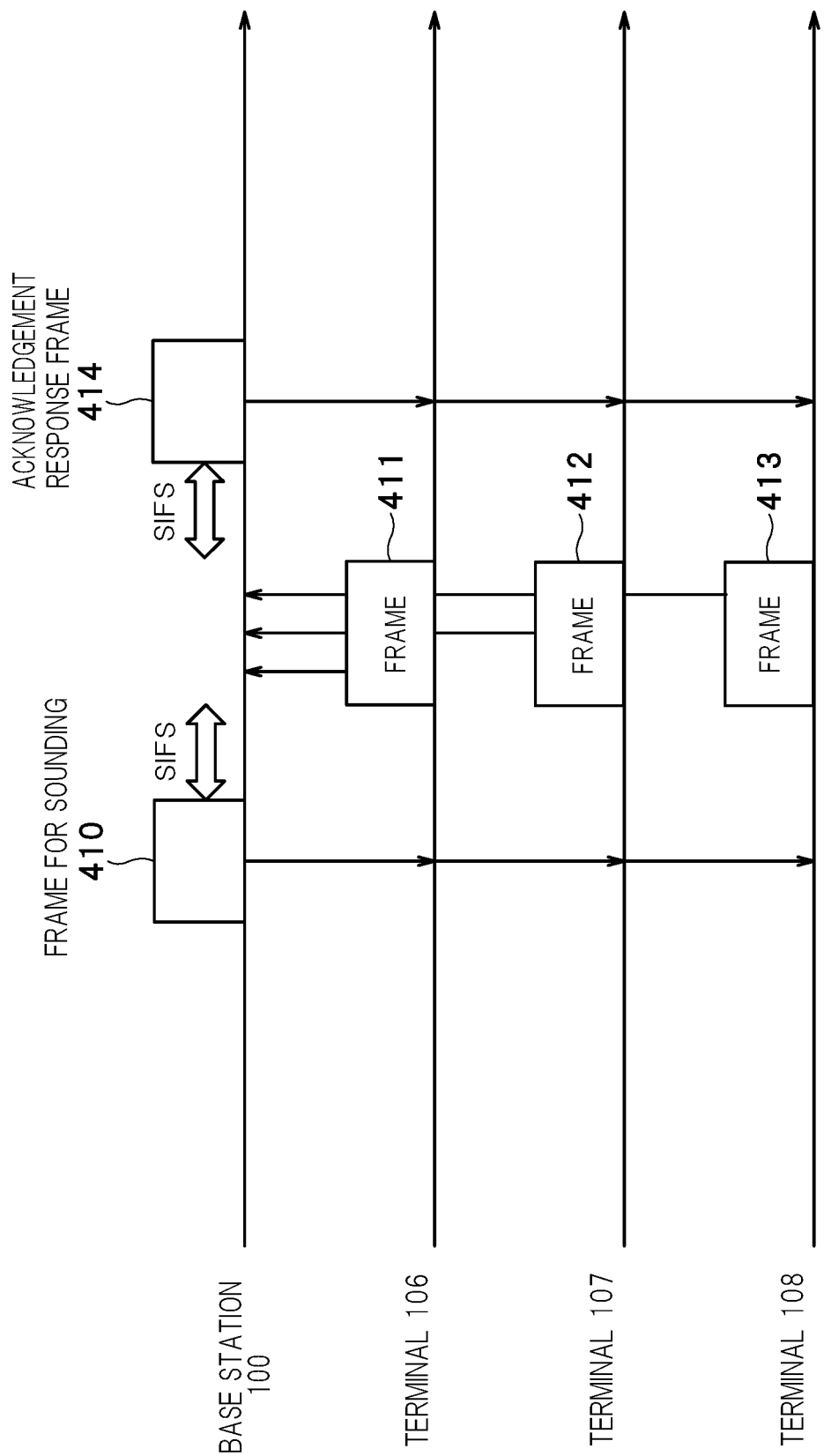
F I G. 14

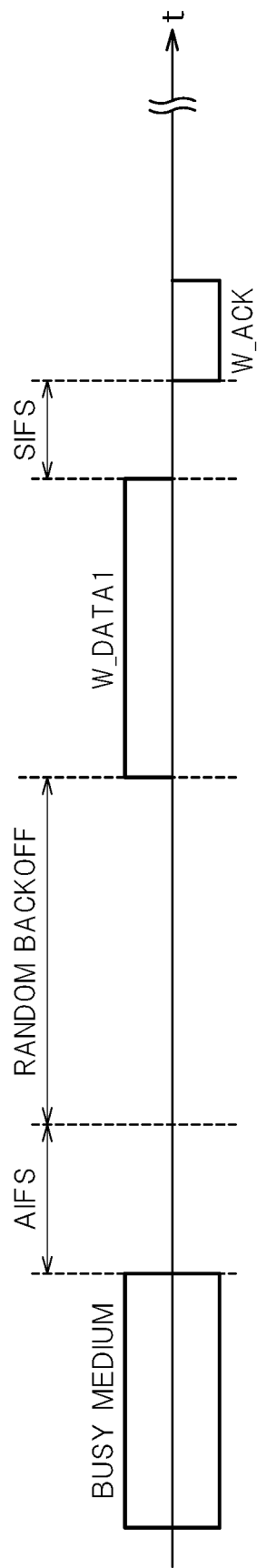
F I G. 19

WIRELESS COMMUNICATION DEVICE

CROSS REFERENCE TO RELATED APPLICATIONS

This application is a Continuation of U.S. patent application Ser. No. 17/952,945 filed on Sep. 26, 2022, which is a Continuation of U.S. patent application Ser. No. 17/074,806 filed on Oct. 20, 2020, now granted U.S. Pat. No. 11,457,333, which is a Continuation of U.S. patent application Ser. No. 15/444,939 filed on Feb. 28, 2017, now granted U.S. Pat. No. 10,827,313, which is a Continuation of International Application No. PCT/JP2015/074784, filed on Aug. 31, 2015, which claims priority to Japanese Patent Application No. 2014-175991 filed on Aug. 29, 2014, the entire contents of which are hereby incorporated by reference.

FIELD

Embodiments described herein relate to a wireless communication device.

BACKGROUND

IEEE Std 802.11ac-2013 discloses a method of preliminarily assigning a group identifier (ID) to multiple wireless communication terminals which are targets of the same multi-user transmission, as a method of executing downlink multi-user MIMO (DL-MU-MIMO). In actual transmission of physical packets of DL-MU-MIMO, their group ID is set in the header (VHT-SIG-A field) of the physical packets in this method. On the other hand, a method is disclosed that sets one to an individual/group bit (I/G bit) in a transmitting STA address or a transmitter address (TA) field of a MAC (Medium Access Control) frame in order to allow a wireless communication terminal having the destination address of the MAC frame in the physical packets to grasp that the width of frequency channel (bandwidth) actually used for physical packet transmission is notified through a scrambling sequence in the physical packet, in transmission with the width of frequency channel (bandwidth) being extended from a width of 20 MHz serving as a basis. The I/G bit used is the first bit of a TA field. One indicates a "group" in an ordinary usage, that is, indicates that this address field is for a group address. Typically, when the transmitting STA address is stored in the TA field, the transmitting STA address indicates the MAC address of a certain wireless communication terminal. Thus, this address serves as a unicast address. Accordingly, the I/G bit is set to zero which indicates "individuality". Meanwhile, intentionally setting the I/G bit to one enables the wireless communication terminal having received the MAC frame to grasp that the width of frequency channel (bandwidth) actually used for physical packet transmission is notified through a scrambling sequence in the physical packet. The transmitting STA address with the I/G bit set to one is referred to as a "bandwidth signaling TA".

IEEE 802.11-14/0598r0 proposes an uplink multi-user MIMO (UL-MU-MIMO) through use of the group ID of IEEE Std 802.11ac-2013 described above. In response to a RTS (Request to Send) frame transmitted by unicast from the wireless communication terminal, a base station sets the group ID in a receiving STA address or a receiver address (RA) field of a CTS (Clear to Send) frame transmitted after the SIFS (Short InterFrame Space) of the RTS frame. More specifically, a six-bit group ID is set at the beginning of a six-octet MAC address field, and subsequently a 42-bit predefined pattern is set. The CTS frame including the group ID is discriminated from an ordinary CTS frame, and is referred to as G CTS frame (CTS frame with Group ID). Among wireless communication terminals having received the G CTS frame, multiple wireless communication terminals having the coinciding group ID execute UL-MU-MIMO transmission SIFS after the G CTS frame. Also in a case of transmission of a response to the UL-MU-MIMO transmission, the base station transmits an ACK frame having an RA field in which the group ID is set. The ACK frame in which the group ID is set is referred to as G ACK frame (ACK frame with Group ID).

The method proposed in IEEE 802.11-14/0598r0 has a possibility that a 48-bit address (Group ID+predefined pattern) including a 6-bit group ID and a predefined 42-bit pattern coincides with the MAC address of any of the wireless communication terminals actually existing in a BSS (Basis Service Set) which is a wireless communication group. Even though the address (Group ID+predefined pattern) is predefined so as not to overlap with the MAC addresses of the wireless communication terminals which constitute the BSS, a new wireless communication terminal may sometimes participate in the BSS in midstream. Thus, the possibility that the MAC address of the wireless communication terminal which is to participate in the future overlaps with the address (Group ID+predefined pattern) cannot be avoided. Possible presence of a wireless communication terminal using the same MAC address causes a problem in that the wireless communication terminal cannot discriminate whether the received CTS frame is a G CTS frame or an ordinary CTS frame destined to itself. A method can also be considered that if a wireless communication terminal having the same MAC address as the address (Group ID+predefined pattern) participates in the BSS in midstream, the base station redefines an address (Group ID+predefined pattern) having a new value. However, this redefined new value is required to be notified to each wireless communication terminal. This notification causes an overhead to efficient transmission. UL-MU-MIMO transmission cannot be performed until completion of notification to each wireless communication terminal. In a case where the group ID for UL-MU-MIMO transmission is common to the group ID for DL-MU-MIMO and the group ID is to be changed, DL-MU-MIMO transmission cannot be also performed for the meantime.

BRIEF DESCRIPTION OF THE DRAWINGS

FIG. 1 is a functional block diagram of a wireless communication device according to a first embodiment;

FIG. 4 is a diagram showing an example of a format of a CTS frame according to the first embodiment;

FIG. 5 is a diagram showing an example of a format of an acknowledgement response frame according to the first embodiment;

FIG. 6 is a diagram showing an example of another format of an acknowledgement response frame according to the first embodiment;

FIG. 8 is a flowchart of a basic operation example of the base station according to the first embodiment;

FIG. 9 is a flowchart of a basic operation example of the terminal according to the first embodiment;

FIG. 10 is a diagram showing an example of an operation sequence between a base station and a terminal according to the second embodiment;

FIG. 11 is a diagram showing a sequence of each terminal sequentially transmitting the acknowledgement response frame;

FIG. 12 is a diagram showing an example of an operation sequence between a base station and a terminal according to the third embodiment;

FIG. 13 is a diagram showing an example of an operation sequence between a base station and a terminal according to a third variation example;

FIG. 14 is a diagram showing an example of an operation sequence between a base station and a terminal according to a fourth variation example;

FIG. 19 is a diagram showing an example of frame exchange in a contention duration.

DETAILED DESCRIPTION

Figure 2:
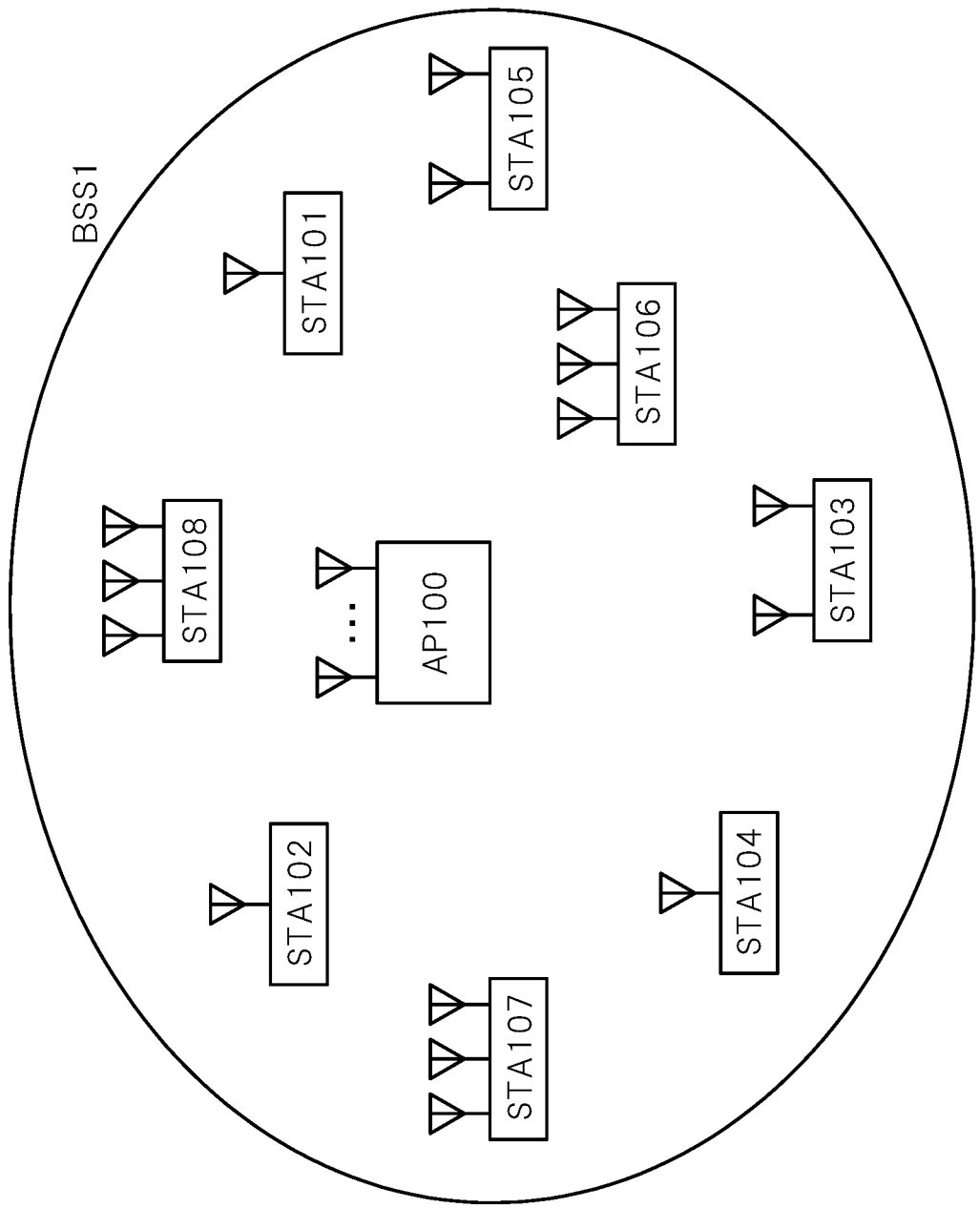
FIG. 2 is a diagram showing a wireless communication system according to the first embodiment.

According to one embodiment, a wireless communication device, includes: a receiver configured to receive a first frame a transmitter address of which is an address of a first wireless communication device and a receiver address of which is an address of the wireless communication device; and a transmitter configured to transmit a second frame generated using a first address process in response to receipt of the first frame. The first address process is a process to set a first value in a first region in a receiver address field of the second frame. The first value is a value different from values settable in first regions in addresses of the first wireless communication device and another wireless communication device capable of receiving the second frame.

Hereinafter, embodiments of the present invention will be described with reference to the drawings.

The entire contents of IEEE Std 802.11™-2012 and IEEE Std 802.11ac™-2013, known as the wireless LAN specification are herein incorporated by reference in the present specification.

First Embodiment

A functional block diagram of a wireless communication device (or a wireless device) according to the first embodiment of the present invention is illustrated in FIG. 1. This wireless communication device can be implemented in a wireless communication base station (hereinafter referred to as a base station or an access point) or in a wireless communication terminal (hereinafter referred to as a terminal) that communicates with the base station. The base station is one mode of the wireless communication terminal (or the terminal) in that the base station has the same or similar communication functions with those of the terminal with exception of the base station having a relay function. When a wireless communication terminal or a terminal is mentioned in the following explanations, it may also refer to a base station as long as the terminal and the base station need not be particularly discriminated from each other.

As illustrated in FIG. 1, a wireless communication device incorporated in a terminal (which may be either a terminal of non-base station or the base station) includes upper layer processor 90, MAC processor 10, physical (PHY) processor 50, MAC/PHY manager 60, analog processor 70 (analog processors 1 to N), and antenna 80 (antennas 1 to N), where N represents an integer equal to or larger than 1. In the figure, the N analog processors and the N antennas are connected in pairs with each other, but the configuration is not limited to the illustrated one. For example, one analog processor and two or more antennas may be connected to this analog processor in a shared manner.

MAC processor 10, MAC/PHY manager 60, and PHY processor 50 correspond to a mode of controller, controlling circuitry or baseband integrated circuit that carries out processing associated with communications with other terminals (including the base station). Analog processor 70 corresponds, for example, to a wireless communicator or a radio frequency (RF) integrated circuit that transmits and receives signals via antenna 80. The integrated circuit for wireless communication in accordance with this embodiment includes at least the former of the baseband integrated circuit and the RF integrated circuit. The functions of the controller, controlling circuitry or the baseband integrated circuit may be performed by software (programs) that runs on a processor such as a CPU or may be performed by hardware, or may be performed by both of the software and the hardware. The software may be stored in a storage medium such as a memory device including a ROM, a RAM, etc., a hard disk, or an SSD and read therefrom to be executed. The memory device may be a volatile memory device such as an SRAM or a DRAM, or a non-volatile memory device such as a NAND or an MRAM.

Upper layer processor 90 is configured to carry out processing for the Medium Access Control (MAC) layer associated with the upper layer or layers. Upper layer processor 90 is can exchange signals with MAC processor 10. As the upper layer, TCP/IP, UDP/IP, and the application layer upper than these two protocols may be mentioned as typical examples but this embodiment is not limited to them. Upper layer processor 90 may include a buffer for exchanging data between the MAC layer and the upper layer or layers. It may also be considered that it may be connectable to a wired infrastructure via upper layer processor 90.

MAC processor 10 is configured to carry out processing for the MAC layer. As described above, MAC processor 10 can exchange signals with upper layer processor 90. Further, MAC processor 10 can exchange signals with PHY processor 50. MAC processor 10 includes MAC common processor 20, transmission processor 30, and reception processor 40.

MAC common processor 20 is configured to carry out common processing for transmission and reception in the MAC layer. MAC common processor 20 is connected to and exchanges signals with upper layer processor 90, transmission processor 30, reception processor 40, and MAC/PHY manager 60.

Transmission processor 30 and reception processor 40 are connected to each other. Also, transmission processor 30 and reception processor 40 are each connected to MAC common processor 20 and PHY processor 50. Transmission processor 30 is configured to carry out transmission processing in the MAC layer. Reception processor 40 is configured to carry out reception processing in the MAC layer.

PHY processor 50 is configured to carry out processing for a physical layer (PHY layer). As described above, PHY processor 50 can exchange signals with MAC processor 10. PHY processor 50 is connected via analog processor 70 to antenna 80.

MAC/PHY manager 60 is connected to upper layer processor 90, MAC processor 10 (more specifically, MAC common processor 20), and PHY processor 50. MAC/PHY manager 60 is configured to manage MAC operation and PHY operation in the wireless communication device.

Analog processor 70 includes an analog-to-digital and digital-to-analog (AD/DA) converter and a radio frequency (RF) circuit. Analog processor 70 is configured to convert a digital signal from PHY processor 50 into an analog signal having a desired frequency and transmit it from antenna 80, or convert a high-frequency analog signal received from antenna 80 into a digital signal. It is considered here that although AD/DA conversion is carried out by analog processor 70, another configuration is also possible according to which PHY processor 50 has the AD/DA conversion function.

The wireless communication device in accordance with this embodiment has its constituent element (i.e., incorporates) antenna 80 in one single chip and thereby makes it possible to reduce the mounting area of antenna 80. Further, in the wireless communication device in accordance with this embodiment, as illustrated in FIG. 1, transmission processor 30 and reception processor 40 shares N antennas 80. By virtue of sharing N antennas 80 by transmission processor 30 and reception processor 40, it is made possible to reduce the size of the wireless communication device of FIG. 1. It is considered here that the wireless communication device in accordance with this embodiment may have a configuration different than the one depicted by way of example in FIG. 1.

In signal transmission to a wireless medium, PHY processor 50 receives a MAC frame from transmission processor 30. PHY processor 50 applies processes, such as adding of a preamble and a PHY header to the MAC frame, encoding, and modulating to convert the MAC frame into a PHY packet. Analog processor 70 converts the PHY packet, which is a digital signal, into an analog signal at a desired frequency. Antenna 80 emits the analog signal from analog processor 70 to the wireless medium. During duration of signal transmission, PHY processor 50 outputs a signal indicating that the wireless medium is busy, to MAC processor 10 (more correctly, to reception processor 40).

PHY processor 50 performs a process pertaining to at least one of uplink multi-user MIMO (DL-MU-MIMO) and downlink multi-user MIMO (DL-MU-MIMO), which are achieved by extending the MIMO technology. In the first embodiment, and a third embodiment described later, at least a process pertaining to UL-MU-MIMO is performed. In a second embodiment described later, at least a process pertaining to DL-MU-MIMO is performed. According to UL-MU-MIMO, the base station simultaneously receives streams transmitted from multiple terminals in a spatial multiplexing manner (i.e., simultaneously in the same frequency band) through multiple antennas, and applies MIMO demodulation to the received signals, thereby separating the demodulated signals into the frames of the terminals. The base station can thus receive the frames simultaneously transmitted from the multiple terminals in the same frequency band. According to DL-MU-MIMO, the base station transmits streams through multiple antennas to the respective terminals in a spatial multiplexing manner, and the terminals apply MIMO demodulation to the received signals to separate the signals into frames, and receive the frames destined to the own terminals. The base station can thus transmit the frames to the multiple terminals simultaneously in the same frequency band.

Here, a technology called beamforming is used for DL-MU-MIMO. According to beamforming, beams with minimum or smaller interferences are formed in the respective streams, and are transmitted. Consequently, spatial multiplexing is allowed, and the base station can achieve reception and transmission with the multiple terminals at the same frequency band. To perform such beamforming, the base station is required to obtain information on channel response (downlink channel response) between the antennas of the own device and the antennas of the terminals. For example, in a case of downlink channel responses, the base station causes transmission processor 30 to generate frames (including a known bit pattern) for channel estimation and transmit the frames to the respective terminals, and allows the frames including the values of channel responses estimated by the terminals to be fed back and causes reception processor 40 to receive the frames, thereby obtaining downlink channel responses with the terminals. Incidentally, in a case of obtaining uplink channel responses, the terminals are caused to transmit frames (including a known bit pattern) for channel estimation, and estimation is made by PHY processor 50 on the basis of the signals of frames received by the base station from the terminals. PHY processor 50 performs beamforming using downlink channel responses. PHY processor 50 performs MIMO demodulation using uplink channel responses in later described UL-MU-MIMO. Such information pertaining to the downlink channel responses and uplink channel responses may be stored in a buffer in PHY processor 50 or a memory accessible from PHY processor 50. Alternatively, the information may be stored in MAC/PHY manager 60 or a memory accessible from MAC/PHY manager 60. Note that the method of obtaining the downlink channel responses and the method of estimating uplink channel responses are not limited to the methods described here.

According to UL-MU-MIMO, the base station receives frames (more specifically, MIMO-modulated PHY packets) through the multiple antennas from the terminals in a spatial multiplexing manner, and PHY processor 50 carries out MIMO demodulation of the received signals on the basis of the preliminarily estimated uplink channel responses, thereby separating the signals into frames. At this time, any of methods, such as the ZF (Zero-Forcing) method, MMSE (Minimum Mean Square Error) method, and maximum likelihood estimation method may be used. As described in after-mentioned variation examples, preambles orthogonal to each other may be added to header sides (in physical headers) of multiple frames uplinked by the multiple terminals, and the uplink channel responses of the respective terminals can be estimated using these preambles. In this case, UL-MU-MIMO can be achieved without preliminary estimation of uplink channel responses. In each terminal, MAC/PHY manager 60 controls MAC processor 10 and PHY processor 50 so as to transmit frames at predetermined timing (e.g., as described later, after lapse of SIFS etc. from completion of reception of a CTS frame received from the base station (more correctly, at a time point of completion of occupation of the wireless medium by a physical packet including the CTS frame; this is also applicable to the following description)), thereby allowing the frames to be transmitted from the corresponding terminal in a spatial multiplexing manner.

According to DL-MU-MIMO, the base station transmits frames from the multiple antennas to the terminals by beamforming. PHY processor 50 generates signals for beamforming transmission for corresponding transmission systems, using transmission weights calculated on the basis of downlink channel responses. Subsequently, after the processes in analog processor 70, the signals are spatially emitted from the antennas corresponding to the respective transmission systems. Each terminal obtains frames destined to the own terminal (e.g., frames where RA is the MAC address of the own terminal) by causing PHY processor 50 to demodulate the received signals.

In reception of a signal from a wireless medium, analog processor 70 converts an analog signal received by antenna 80 into a baseband signal that can be processed by PHY processor 50, and further converts the baseband signal into a digital signal. PHY processor 50 is configured to receive a digital received signal from analog processor 70 and detect its reception level. The detected reception level is compared with the carrier sense level (threshold). When the reception level is equal to or larger than the carrier sense level, PHY processor 50 outputs a signal indicative of the determination result that the medium (CCA: Clear Channel Assessment) is in the busy state to MAC processor 10 (reception processor 40 to be more precise). When the reception level is less than the carrier sense level, PHY processor 50 outputs a signal indicative of the determination result that the medium (CCA) is in the idle state to MAC processor 10 (reception processor 40 to be more precise).

PHY processor 50 is configured to carry out decoding processing for the received signal (including MIMO decoding), processing of removing a physical header (PHY header) including a preamble, or the like, and extracts a payload. According to IEEE 802.11 standard, this payload is called physical layer convergence procedure (PLCP) service data unit (PSDU) on the PHY side. PHY processor 50 delivers the extracted payload to reception processor 40, and reception processor 40 handles it as a MAC frame. According to IEEE 802.11 standard, this MAC frame is called medium access control (MAC) protocol data unit (MPDU). In addition, PHY processor 50, when it started to receive the reception signal, notifies the fact of having started reception of the reception frame to reception processor 40, and, when it completed the reception of the reception signal, notifies the fact of having completed the reception to reception processor 40. Also, PHY processor 50, when the reception signal has been decoded successfully as the physical packet (PHY packet) (when it does not detect an error), notifies the completion of the reception of the reception signal and delivers a signal indicative of the fact that the medium is in the idle state to reception processor 40. PHY processor 50, when it detected an error in the reception signal, notifies the fact that the error has been detected with an appropriate error code in accordance with the error type to reception processor 40. Also, PHY processor 50, at the timing at which the medium has been determined to enter the idle state, notifies a signal indicative of the fact that the medium is in the idle state to reception processor 40.

MAC common processor 20 performs intermediary processing for delivery of transmission data from upper layer processor 90 to transmission processor 30 and for delivery of reception data from reception processor 40 to upper layer processor 90. According to IEEE 802.11 standard, the data in this MAC data frame is called medium access control (MAC) service data unit (MSDU). Also, MAC common processor 20 receives instructions from MAC/PHY manager 60 and then converts the instruction into appropriate form of instructions for transmission processor 30 and reception processor 40 and outputs the converted instructions to these units.

MAC/PHY manager 60 corresponds, for example, to station management entity (SME) in IEEE 802.11 standard. In that case, the interface between MAC/PHY manager 60 and MAC common processor 20 corresponds to MAC subLayer management entity service access point (MLME SAP) in IEEE 802.11 standard, and the interface between MAC/PHY manager 60 and PHY processor 50 corresponds to physical layer management entity service access point (PLME SAP) in IEEE 802.11 wireless local area network (LAN).

It is considered here that although MAC/PHY manager 60 in FIG. 1 is illustrated on the assumption that the functional unit for the MAC management and the functional unit for the PHY management are configured to be integral with each other, these units may be separately implemented.

MAC/PHY manager 60 holds a management information base (MIB). The MIB holds various pieces of information, such as the capabilities of the own terminal, and the validities of various functions. For example, information on whether the own terminal supports UL-MU-MIMO or DL-MU-MIMO may also be stored. A memory for holding and managing the MIB may be included in MAC/PHY manager 60, or separately provided without being included in MAC/PHY manager 60. In a case where the memory for holding and managing the MIB is separately provided besides MAC/PHY manager 60, MAC/PHY manager 60 can refer to the other memory and rewrite rewritable parameters in the memory. The base station can receive such information at other non-base station terminals, by means of notification from the terminals which are non-base stations. The information may be stored in association with information on the channel responses and various weights, together with information on the own terminal. In this case, MAC/PHY manager 60 can refer to and rewrite information pertaining to other terminals. A memory for storing information pertaining to the other terminals may be held and managed separately from the MIB. In this case, it is configured so that MAC/PHY manager 60 or MAC common processor 20 can refer to or rewrite the other memory.

MAC/PHY manager 60 or MAC common processor 20 of the terminal serving as a base station manages generation of a group for performing UL-MU-MIMO or DL-MU-MIMO, and assignment of a group identifier (hereinafter, referred to as a group ID). The base station combines terminals that perform UL-MU-MIMO or DL-MU-MIMO among terminals with established communication links (described later), generates a group of terminals, and manages the terminals belonging to each group on the basis of the their MAC address (or an association ID described later). For example, provided that there is ten terminals with established links (terminals 1 to 10, for convenience sake), terminals 1 to 4 are combined into a first group, wireless terminals 1, 3, 5 and 6 are combined into a second group, and terminals 6 to 10 are combined into a third group. The groups are assigned respective unique group IDs (group identifiers). In this case, the group IDs defined for DL-MU-MIMO by IEEE Std 802.11ac-2013 may be used. In the UL-MU-MIMO or DL-MU-MIMO communication, the group is designated by the group ID, and multiplexed transmission is performed across multiple terminals on a group-by-group basis. The base station notifies a result of grouping as the group ID to each terminal using a management frame (the details are described later), thereby allowing each terminal to grasp the group to which the device itself belongs. The grouping method may be a method of combining terminals with low correlations into the same group using, for example, downlink or uplink channel responses of the respective terminals. Alternatively, grouping may be made using another method.

MAC processor 10 is configured to handle three types of MAC frames, i.e., a data frame, a control frame, and a management frame, and carry out various processing procedures defined in the MAC layer. Here, the three types of MAC frames are described.

The management frame is for use in management of communication link with another terminal. As the management frame, for example, Beacon frame may be mentioned. The Beacon frame notifies attribute and synchronization information of a group to form a wireless communication group which is a Basic Service Set (BSS) in IEEE 802.11 standard. Also, a frame for authentication or establishing the communication link may also be mentioned. It is considered here that a state where a certain terminal completed exchange of information necessary for establishing a wireless communication with another terminal is expressed here as (the state where) the communication link is established. As the exchange of necessary information, for example, notification of the functions that the device itself supports (for example, support of the OFDMA scheme and various capabilities which will be later described, etc.), and negotiation regarding settings of the scheme may be mentioned. The management frame is generated on the basis of the instruction received by transmission processor 30 from MAC/PHY manager 60 via MAC common processor 20.

With regard to the management frame, transmission processor 30 includes a notifier which notifies various pieces of information to other terminals by the management frame. A terminal that is not a base station may notify information on the terminal itself to the base station by putting in the management frame information regarding such as whether it is an UL-MU-MIMO-compliant terminal or an DL-MU-MIMO-compliant terminal. As for this management frame, for example, Association Request frame used in the association process or Reassociation Request frame used in the reassociation process may be mentioned. The association process and the reassociation process are kinds of steps taken for authentication between the non-base station terminal and the base station. MAC/PHY manager 60 may be provided with a notification controller that controls the notifier so as to transmit the information through a management frame. The notifier of the base station may notify information on UL-MU-MIMO or DL-MU-MIMO supportability to the non-base station through the management frame. This management frame may be, for example, a beacon frame, or a probe response frame that is a response to a probe request frame transmitted from the non-base station terminal. MAC/PHY manager 60 may include a notification controller that controls the notifier so as to transmit the information through the management frame. The notifier of the base station may notify the assigned group IDs to the terminals through the management frames. The management frame may be, for example, a group ID management fame. MAC/PHY manager 60 may include a notification controller that controls the notifier so as to transmit the group ID through the management frame.

Reception processor 40 has a receiver that receives various types of information via the management frame from other terminals. As one example, the receiver of the non-base station terminal may receive information associated with compatibility with UL-MU-MIMO or DL-MU-MIMO communication from the base station. The receiver of the base station may receive information associated with compatibility with UL-MU-MIMO or DL-MU-MIMO communication from the terminal as non-base station. The examples of the information to be transmitted and received via the management frame as described above are merely examples and various other types of information can be transmitted and received via the management frame between terminals (including the base station).

The data frame is for use in transmission of data to another terminal in a state where the communication link is established with the other terminal. For example, data is generated in the terminal by an operation of an application by a user, and the data is carried by the data frame. Specifically, the generated data is delivered from upper layer processor 90, via MAC common processor 20, and to transmission processor 30, the data is put into the frame body field by transmission processor 30 to generate the data frame. The data frame is transmitted via PHY processor 50, analog processor 70 and antenna 80. Also, when reception processor 40 receives the data frame via PHY processor 50 (recognizes that the received MAC frame is a data frame), reception processor 40 extracts the information in the frame body field as data, and delivers the extracted data via MAC common processor 20 to upper layer processor 90. As a result, operations occur on applications such as writing, reproduction, and the like of the data.

The control frame is for use in control in transmission and reception (exchange) of the management frame and the data frame to/from (with) the other wireless communication device. As the control frame, for example, RTS (Request to Send) frame, CTS (Clear to Send) frame may be mentioned which are exchanged with the other wireless communication device to make a reservation of the wireless medium prior to starting exchange of the management frame and the data frame. Also, as another control frame, an acknowledgement response frame for confirmation of delivery of the received management frame and the data frame may be mentioned. As examples of the acknowledgement response frame, ACK frame and BA (BlockACK) frame may be mentioned. These control frames are also generated in the transmission processor 30. With regard to the control frames (CTS frame, ACK frame, BA frame, etc.) transmitted as a response to the received MAC frame, reception processor 40 determines whether or not transmission of a response frame (control frame) is necessary, and outputs information necessary for frame generation (type of the control frame, information specified in the RA (Receiver Address) field, and the like) to transmission processor 30 along with the transmission instruction. Transmission processor 30 generates an appropriate control frame on the basis of the information necessary for generation of the frame and the transmission instruction.

In this embodiment, the base station designates the group ID through the CTS frame for response to receipt of the RTS frame from the terminal serving as the non-base station, thereby allowing permission or instruction of UL-MU-MIMO transmission for the terminals belonging to the group ID. As described later in FIG. 4, a response is made with a CTS frame where a predetermined first region of the RA field of the CTS frame, more specifically, "Individual/Group" bit (I/G bit) is set to "1" (first value), a predetermined second region (e.g., 3-th to 8-th bits) of the RA field is set to the group ID (the group ID of the group to which the terminal having transmitted the RTS frame belongs). In the first to third embodiments, an example of setting the group ID in the predetermined second region of the RA field: however, the present invention is not limited thereto. As described in after-mentioned first to fourth variation examples, various embodiments with a basis where the I/G bit is set to one can be configured.

Upon receipt of the RTS frame, reception processor 40 of the base station passes information for generating the CTS frame to transmission processor 30, and transmission processor 30 generates the CTS frame using the information. In this case, in transmission processor 30, determination of permission or instruction of UL-MU-MIMO transmission through the CTS frame is added in addition to the conventional CTS frame generating process. According to the determination, a normal CTS frame is generated or a CTS frame for permission or instruction of UL-MU-MIMO transmission is generated. The determination on whether permission or instruction of UL-MU-MIMO transmission is made may be performed by MAC common processor 20 or MAC/PHY manager 60, and transmission processor 30 may generate a desired CTS frame in response to the determination of permission or instruction. Alternatively, when reception processor 40 receives the RTS frame, reception processor 40 may determine whether permission or instruction of UL-MU-MIMO transmission is made through the CTS frame, designate the RA field of the CTS frame in response to the determination, and notify the designation together with the instruction for generating the CTS frame to transmission processor 30. Also in this case, the determination on whether permission or instruction of UL-MU-MIMO transmission is made by reception processor 40 itself may be performed by MAC common processor 20 or MAC/PHY manager 60, and reception processor 40 may issue an instruction for generating a desired CTS frame to transmission processor 30 in response to the determination of permission or instruction. Adoption of the CTS frame with the JIG bit being set to one negates the possibility that the value of the RA field of the CTS frame coincides with the MAC address of the terminal in the BSS or the MAC address of a terminal which may participate in the BSS in the future. Consequently, the group ID can be set in the RA field without specifically causing any problem.

Reception processor 40 of the terminal having received the CTS frame determines that the frame type (type and subtype) is "Control" or "CTS" on the basis of the "Frame Control" field. As the JIG bit of the RA field is one, it can be grasped that the CTS frame is for permission or instruction of UL-MU-MIMO transmission, and the group ID is set in the predetermined second region in the RA field. The group ID is then extracted from the predetermined second region. MAC/PHY manager 60 compares the extracted group ID with the group ID of the group to which the own terminal belongs. When both the IDs coincide with each other, this MAC/PHY manager 60 controls MAC processor 10 and PHY processor 50 to perform UL-MU-MIMO transmission (individual frame transmission to the base station in view of the terminal level) at predetermined timing. In a normal case, the terminal having received the frame from the base station expect that the JIG bit (leading bit) of the RA field is zero when the frame type (type and subtype) is "Control" and "CTS". This is because the value in the TA field of the RTS frame is copied and set in the RA field of the CTS frame in a normal case. However, the CTS frame according to this embodiment can be used as a frame for permission or instruction of UL-MU-MIMO transmission as described above because the JIG bit of the RA field is one. The details are further described later. In a case where the non-base station having transmitted the RTS frame to the base station receives the CTS frame SIFS-duration after transmission of the RTS frame, and the CTS frame is for permission or instruction of UL-MU-MIMO transmission, extraction of the group ID and the comparison with the group ID of the group to which the own terminal belongs may be omitted and the frame may be transmitted SIFS-duration after completion of receiving the CTS frame.

In this embodiment, when the base station transmits an acknowledgement response frame which serves as a response to UL-MU-MIMO transmission from multiple terminals, this station may set the JIG bit of the RA field in the acknowledgement response frame to one, and set the group ID in a part of the remaining field region (here, the predetermined second region as with the CTS frame but there is no limitation thereto). A value indicating acknowledgement ("Ack", "BlockAck" or the like) is set in the frame type. Upon receipt of a data frame from each terminal to which UL-MU-MIMO transmission has been made, reception processor 40 passes information for generating an acknowledgement response frame (information on whether the reception of a data frame succeeded or not (ACK information) on each terminal, a value to be set in the RA field, a value of the frame type and the like) to transmission processor 30. Transmission processor 30 generates the acknowledgement response frame using the information. It is determined whether the acknowledgement response frame containing the group ID is generated according to receipt of UL-MU-MIMO transmission by transmission processor 30 or reception processor 40, or the determination conforms to a result of determination of permission or instruction of UL-MU-MIMO transmission through the CTS frame. The conformity to the result of determination of permission or instruction of UL-MU-MIMO transmission through the CTS frame is specifically described as follows. The result of determination of permission or instruction of UL-MU-MIMO transmission by any processor or manager in the case of CTS frame is allowed to be held and referred to in the same frame exchange sequence (corresponding to TXOP (Transmission Opportunity) in IEEE802.11 standards), and the held result is referred to and a value to be set in the RA field is determined when the acknowledgement response frame is generated. The acknowledgement response frame used for this purpose may reuse the format of a BA frame or have a newly defined frame format. The details of the format are described later. This negates the possibility that the value of the RA field of the acknowledgement response frame coincides with the MAC address of the terminal in the BSS or the MAC address of a terminal which may participate in the BSS in the future. Consequently, the group ID can be set in the RA field of the acknowledgement response frame without specifically causing any problem. Reception processor 40 of the terminal having received the acknowledgement response frame determines that the frame type is acknowledgement on the basis of the "Frame Control" field (e.g., the frame type or subtype is "Control" and "Block-Ack" (or "Ack")). As the JIG bit of the RA field is one, it is grasped that the group ID is set in the predetermined second region in the RA field. The group ID is extracted from the predetermined second region and notified to MAC/PHY manager 60. MAC/PHY manager 60 compares the extracted group ID with the group ID to which the own terminal belongs. When both the IDs coincide with each other, this manager notifies the coincidence to reception processor 40. Reception processor 40 (or MAC/PHY manager 60) identifies ACK information on the own terminal from the acknowledgement response frame, and determines whether frame transmission is succeeded on the basis of the ACK information.

When a MAC frame is transmitted on the basis of CSMA/CA (Carrier Sense Multiple Access with Carrier Avoidance), MAC processor 10 needs to acquire the access right (transmission right) on the wireless medium. Transmission processor 30, on the basis of carrier sense information from reception processor 40, measures transmission timing. Transmission processor 30, in accordance with the transmission timing, gives the transmission instruction to PHY processor 50, and further delivers the MAC frame thereto. In addition to the transmission instruction, transmission processor 30 may instruct a modulation method and a coding method to be used in the transmission. In addition to them, transmission processor 30 may provide an instruction regarding the transmission power. When MAC processor 10, after having acquired the access right (transmission right), obtained the period of time during which the medium can be occupied (Transmission Opportunity; TXOP), then MAC processor 10 is allowed to continuously exchange the MAC frames with other wireless communication devices although there is some limitation such as the QoS (Quality of Service) attribute. The TXOP is acquired, for example, when the wireless communication device transmits a predetermined frame (for example, an RTS frame) on the basis of CSMA/CA (Carrier Sense Multiple Access with Carrier Avoidance) and successfully receives a response frame (for example, a CTS frame) from another wireless communication device. When this predetermined frame is received by the other wireless communication device, the other wireless communication device transmits the above response frame after the elapse of the minimum frame interval (Short InterFrame Space; SIFS). Also, as a method of acquiring the TXOP without using the RTS frame, for example, cases may be mentioned where data frame that requests transmission of the acknowledgement response frame is transmitted directly by the unicast (as will be described later, this frame may be a frame in the form of aggregated frames or aggregated payloads) or a management frame that requests transmission of the acknowledgement response frame is transmitted, and acknowledgement response frame (ACK frame, BlockACK frame or the like) in response thereto is successfully received. Alternatively, when a frame is transmitted that does not request, for the other wireless communication device, transmission of the acknowledgement response frame, in which a period equal to or longer than a time period needed to transmit this frame is specified in the Duration/ID field of the frame, then it may be interpreted that with the transmission of this frame, TXOP of the period described in the Duration/ID field has been acquired.

Reception processor 40 is configured to manage the above-described carrier sense information. This carrier sense information includes both physical carrier sense information regarding busy/idle states of the medium (CCA) input from PHY processor 50 and virtual carrier sense information on the basis of the medium reservation time described in the received frame. If either one of these carrier sense information pieces indicates the busy state, then the medium is regarded as being in the busy state in which transmission is prohibited. It is considered here that in IEEE 802.11 standard, the medium reservation time is described in the Duration/ID field in the MAC header. MAC processor 10, when having received a MAC frame that is addressed to other wireless communication devices (that is not addressed to the device itself), determines that the medium is virtually in the busy state from the end of the physical packet including this MAC frame over the medium reservation time. A scheme of this type for virtually determining that a medium is in the busy state, or the term during which the medium is virtually regarded as being in the busy state is called Network Allocation Vector (NAV). When reception processor 40 receives a frame including permission or instruction of UL-MU-MIMO transmission from another wireless communication device to the group to which the own terminal belongs (the CTS frame (see FIG. 4) according to this embodiment or the like, described later) during NAV, this processor may permit UL-MU-MIMO transmission of frames according to the permission or instruction even in NAV setting.

Here, the data frame may be a frame such that a plurality of MAC frames (i.e., MPDUs or sub-frames) are aggregated with each other or payload portions of a plurality of MAC frames are aggregated with each other. The former data frame is called an A (Aggregated)-MPDU and the latter data frame is called an A (Aggregated)-MSDU (MAC service data unit) in IEEE 802.11 standard. Also, when responses to the plurality of MAC frames are collectively transmitted in such a case of the data frame being A-MPDU, a BA (BlockACK) frame is used as the responses instead of the ACK frame. The terminal of the non-base station may notify UL-MU-MIMO or DL-MU-MIMO supportability to the base station to be connected. According to IEEE802.11 standards, procedures which allow the terminal of the non-base station to participate in the BSS configured centered at the base station (referred to as an infrastructure BSS), and also allow data frame exchange in BSS are defined stepwise. Thus, in order for the terminal of the non-base station to notify UL-MU-MIMO or DL-MU-MIMO supportability to the base station to which the terminal plans to connect, the terminal of the non-base station may set UL-MU-MIMO or DL-MU-MIMO supportability in a management frame to be transmitted from the terminal of the non-base station to the base station, in these procedures.

For example, there is provided a procedure called association, according to which an association request frame is transmitted from the terminal that is not the base station to the base station to which the terminal requests the connection. The base station, after having transmitted an ACK frame for the association request frame, transmits an association response frame which is a response to the association request frame. The terminal stores the capability of the terminal itself in the association request frame and transmits this association request frame, and thus can make notification of the capability of the terminal itself to the base station. For example, the terminal may add, to the association request frame, UL-MU-MIMO or DL-MU-MIMO supportability. This information may be also set in the frame transmitted by the procedure called reassociation (reassociation) to reconnect to another base station. In this procedure of reassociation, a reassociation request frame is transmitted to the other base station to which reconnection is requested from the terminal. The other base station, after having transmitted the ACK frame in response to the reassociation request frame, transmits a reassociation response which is a response to the reassociation request frame. The terminal may add, to the reassociation request frame, UL-MU-MIMO or DL-MU-MIMO supportability. As the management frame, in addition to the association request frame and the reassociation request frame, a beacon frame, a probe response frame, etc. may be used. The beacon frame is basically transmitted by the base station, and stores parameter notifying the capability of the base station itself along with the parameters indicating the attributes of the BSS. In view of this, as the parameter notifying the capability of the base station itself, the base station may be adapted to add the information on whether or not UL-MU-MIMO or DL-MU-MIMO is supported. The probe response frame is a frame transmitted from the terminal that transmits the beacon frame in response to a probe request frame received. The probe response frame is basically the one that notifies the same content as that of the beacon frame, and the base station, when it uses the probe response frame, can notify UL-MU-MIMO or DL-MU-MIMO supportability of the station itself to the terminal that transmitted the probe request frame.

It is considered here that if notification of some piece or pieces of information among the pieces of information mentioned above leads to definition of the content of another piece or other pieces of information, then notification of the other piece or pieces of information may be omitted. For example, suppose a case where a terminal is always an UL-MU-MIMO or DL-MU-MIMO-compliant terminal if a capability that is compliant with a new standard or a new specification is defined and as long as the terminal is compliant with that capability or specification. In this case, when presence of the capability to be compliant with the standard or specification is notified, and notification of the fact that the terminal is an UL-MU-MIMO or DL-MU-MIMO-compliant terminal does not need to be explicitly performed.

FIG. 2 shows a wireless communication system according to the embodiment of the present invention. It is assumed that one base station (AP: Access Point) 100 and multiple terminals (STA: STAtion) 101 to 108 which are non-base stations constitute a wireless communication system or BSS1. It is assumed that base station 100 is enabling UL-MU-MIMO in this BSS1. Base station 100 groups terminals in BSS1. It is herein assumed that at least terminals 101, 102 and 103 are combined into the same group, this group is assigned a group ID, which may be for example a group ID defined for DL-MU-MIMO in IEEE Std 802.11ac-2013, and the group ID is notified to the terminals 101 to 103. Terminals 101 to 103 can support UL-MU-MIMO, and is in a state where UL-MU-MIMO is effective. One terminal may belong to multiple groups. In this case, the group ID of each group is notified to the terminal.

Base station 100 holds UL-MU-MIMO supportability of base station 100 itself as information in the MIB, for example. For example, terminals 101 to 103 also have this MIB, in which the UL-MU-MIMO supportability is set in an analogous manner. For example, base station 100 further has in the MIB information that indicates whether UL-MU-MIMO is available (in an effective state). When UL-MU-MIMO is effective, base station 100 may set the usability of UL-MU-MIMO in a management frame generated by transmission processor 30. For example, a beacon frame, a probe response frame or the like may be used as the management frame. The probe response frame is a frame to be transmitted as follows. That is, the probe request frame of the management frame is received by the terminal (base station in the case of an infrastructure BSS) that is to transmit the beacon frame, and in a case where the terminal (base station) constitutes BSS that conforms to a condition required for the probe response frame, this probe request frame is transmitted as a response to the received probe request frame. The beacon frame is an announcement frame. That is, the destination address (RA) of the beacon frame is a broadcast address. On the other hand, the RA of the probe response frame is a unicast address that designates the address of a certain terminal. The RA is set at the beginning of the multiple address fields of a MAC header provided at the beginning of a MAC frame. In the beacon frame and the probe response frame, information on usability of UL-MU-MIMO is set as a parameter that indicates the attribute of the BSS. UL-MU-MIMO supportability is a capability. This can also be set in the beacon frame and the probe response frame, as described above.

Figure 3:
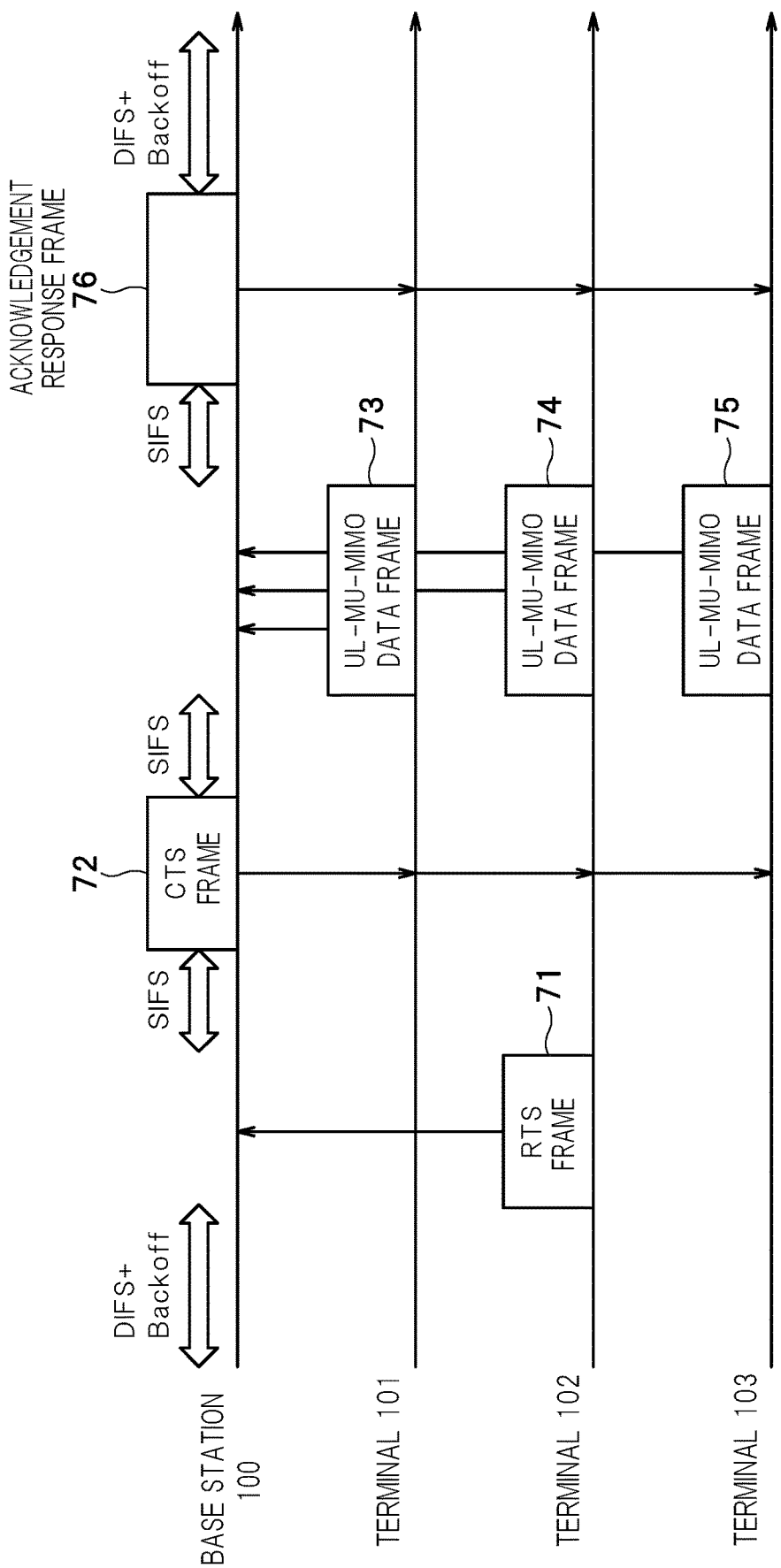
FIG. 3 is a diagram showing an example of an operation sequence between a base station and a terminal according to the first embodiment.

FIG. 3 shows an example of an operation sequence of base station 100 and terminals 101 to 103 shown in FIG. 2. Terminals 101 to 103 each have data to be transmitted to base station 100. The data frame including such data indicates a sequence in a case of transmission from terminals 101 to 103 to base station 100 through UL-MU-MIMO. As described above, terminals 101 to 103 are combined into the same group by base station 100, and the group ID of this group is preliminarily notified to the terminals.

It is assumed that terminal 102 detects that a medium is busy as a result of observing the medium in order to transmit a data frame, carrier sensing is performed during, for example, a duration called DIFS and a randomly determined backoff duration subsequent thereto, and an access right (transmission right) is obtained as result for carrier sensing being idle. In this case, terminal 102 transmits RTS frame 71 for requesting permission of data frame transmission in order to obtain, from base station 100, the permission of data frame transmission. At a stage of transmitting RTS frame 71, terminal 102 does not necessarily assume that data frame transmission after receipt of the CTS frame is UL-MU-MIMO transmission. The frame type (type and subtype) of RTS frame 71 is "Control" and "RTS" (transmission permission request). A transmitting STA address or a transmitter address (TA) of RTS frame 71 is the MAC address of terminal 102, and the receiving STA address (RA) is the MAC address of base station 100. This RTS frame 71 is received by base station 100, and also by terminals 101 and 103. Upon receipt of RTS frame 71, terminals 101 and 103 set NAV on the basis of the value written in the Duration field of RTS frame 71. Terminals 101 and 103 grasp that RTS frame 71 has been transmitted to base station 100 according to TA of this RTS frame 71.

Upon receipt of RTS frame 71, base station 100 verifies the frame type, TA, RA and the like, and grasps that the frame type (type and subtype) is "Control" and "RTS" (transmission permission request), TA is terminal 102, and RA is base station 100. Base station 100 grasps the group to which terminal 102 belongs, on the basis of the MAC address stored in the TA field. Base station 100 sets the predetermined first region (here, the leading bit) in the RA field to "1" in order to permit the terminals (terminals 101 to 103) in the group to which terminal 102 belongs to perform UL-MU-MIMO transmission of data frames, and generates a CTS frame (CTS frame according to this embodiment) where the value indicating the group ID of the group to which terminal 102 belongs is set in the predetermined second region that is other than the leading bit of the RA field. The remaining region other than the leading bit in the RA field and the predetermined second region may be a reserved region. Alternatively, a predefined pattern may be set therein. In the case of a reserved region, any value (one or zero) may be set in each bit in the reserved region. Base station 100 transmits thus generated CTS frame 72 according to this embodiment, upon lapse of duration called SIFS after completion of receipt of RTS frame 71. Note that the CTS frame contains no TA field. Upon receipt of RTS frame 71 from terminal 102, base station 100 determines whether to allow UL-MU-MIMO transmission to the terminals (terminals 101 to 103) in the group to which terminal 102 belongs as described above, and transmits CTS frame 72 for permitting UL-MU-MIMO transmission of data frames when determining to permit UL-MU-MIMO transmission.

FIG. 4(A) shows the format of the CTS frame according to this embodiment. The CTS frame consists of a "Frame Control" field, a "Duration" field, an "RA" field, and a "FCS" (Frame Check Sequence) field.

In the "Frame Control" field, information indicating a frame type and the like are set. The frame type is identified through two fields, that are "Type" and "Subtype", in the "Frame Control" field. In a case of the CTS frame, a value representing "Control" is set in the "Frame Type", and a value representing CTS (permission of transmission) is set in the "Frame Subtype". FCS information on the frame is set in the FCS field. The FCS information is used for error detection of a frame body on a reception side. In the "Duration" field, medium reservation time is set, as described above.

The RA field has a length of six octets (48 bits). As to a normal CTS frame, the MAC address of the destination terminal is stored in the RA field. However, as to the CTS frame according to this embodiment, separately defined format information is set in the RA field. FIG. 4(B) shows an example of the format of the RA field in the CTS frame according to this embodiment. In this specification, RA having such a format is referred to as Group ID signaling RA. The leading bit is a field to verify an "Individual/Group" address, and set to "1" (first value) indicating the group. The I/G bit corresponds to the predetermined first region of the RA field. In this embodiment, the I/G bit is the leading bit. Alternatively, a bit at another position may be defined as the I/G bit. The predetermined first region does not necessarily have one bit. Alternatively, this region may have two or more bits. In this case, the bits are not necessarily sequential bits. Alternatively, these bits may be bits at positions apart from each other. In the MAC address, the leading bit indicates the "Individual/Group" address. In the MAC address (six octets) of an individual terminal (device), the I/G bit is "0". In normal transmission (unicast transmission), the MAC address of the device is set as it is in the RA field. Consequently, the I/G bit of the RA field is "0". In broadcast or multicast transmission, the JIG bit of the RA field is set to "1". Typically, in transmission of the CTS frame, the TA address of the RTS frame is copied and used. Alternatively, in a case the CTS frame is transmitted autonomously without receipt of the RTS frame as described later, the MAC address of the own terminal is set. Because of being a unicast frame for these cases, the JIG bit of the RA field is "0". However, the CTS frame according to this embodiment has a characteristic that sets the JIG bit to "1".

The second bit is a "Reserved" field. Six bits from the third to eighth bits correspond to the predetermined second region described above, and are set to the group ID. The remaining 40 bits are a "Reserved" field. The "Reserved" field may be set to any value (e.g., entirely zero). One or both of two "Reserved" fields may be changed to be set to a predefined pattern. Use of this pattern allows additional information to be notified to the terminals in the group designated by the group ID; the additional information is, for example, information for reconfirming that the CTS frame has been transmitted to permit UL-MU-MIMO transmission. Among parts serving as the "Reserved" fields in FIG. 4(B), two octets may be used for designating time in which the data frame in UL-MU-MIMO transmission occupies the medium, that is, the physical packet length for storing the data frame.

Here, the group ID is set in the predetermined second region that consists of six bits from the third to eighth bits. The region for setting the group ID is not limited to this region. Any region can be defined as a group ID setting region, only if each terminal and the base station can commonly recognize the region in which the group ID in the RA field is set. The group ID setting region may be predefined in a system or specifications. Alternatively, the group ID setting region may be defined by the base station, the group ID setting region may be notified from the base station to the terminals in the same BSS through the management frame. Here, the positions of the group ID setting regions may be different on a group-by-group basis. In this case, individual setting regions may be notified to the respective groups.

Terminals 101 to 103 receive CTS frame 72 that has the format in FIG. 4 and has been transmitted from base station 100, and verifies the "Frame Type" ("Frame Type" and "Frame Subtype") and the RA field. Based on the fact that the "Frame Type" is "Control", the "Frame Subtype" is "CTS", and the value of the leading bit ("Individual/Group" ID) of the RA field is one, it is grasped that this frame is the CTS frame according to this embodiment, that is, the CTS frame for permission or instruction of UL-MU-MIMO transmission. Furthermore, it is grasped that the predetermined second region (third to eighth bits) in the RA field is set to a group ID.

Each terminals 101 to 103 extracts the group ID from the third to eighth bits of the RA field, and compares the extracted group ID with the group ID of the group to which the own terminal belongs. In the case where the own terminal belongs to multiple groups, comparison is made with the group ID of each group to which the own terminal belongs. When it is determined that the own terminal belongs to the group with the group ID notified from the base station as a result of the comparison, it is determined that UL-MU-MIMO transmission is performed. That is, the terminal generates a data frame including data to be transmitted to the base station. Upon lapse of SIFS after completion of receipt of the CTS frame according to this embodiment, the terminal together with the other terminals belonging to the same group transmits the data frame (more specifically, a physical packet including the data frame) in a spatial multiplexing manner. Alternatively, when it is determined that the own terminal belongs to the group with the group ID notified from the base station as a result of the comparison and there is a data frame to be transmitted from the own terminal to the base station, it may be determined that UL-MU-MIMO transmission is to be performed. In this case, without the data frame to be transmitted from the own terminal to the base station, no data frame is transmitted even lapse of SIFS after receipt of the CTS frame. Alternatively, when it is determined that the own terminal belongs to the group with the group ID notified from the base station as a result of the comparison and there is no data frame to be transmitted from the own terminal to the base station, it may be configured such that a data packet having an empty payload (in IEEE802.11 specification, e.g., "QoS Null" frame) may be transmitted. In this case, the base station having received a data packet having an empty payload interprets that the source terminal transmits no data frame in uplink transmit opportunities thereafter in the TXOP concerned. Accordingly, for example, in the uplink transmit opportunities thereafter in the TXOP concerned, the number of multiplexes is the number from which the number of these source terminals which transmitted empty payload is subtracted, and multiple receiving antennas can be used to receive frames from the remaining terminals, thereby allowing the receiving performance to be improved. Unlike terminal 102 having data frames to be transmitted and having transmitted RTS frame 71, terminals 101 and 103 may be brought into such a situation. In a case where the physical packet length for storing the data frame in UL-MU-MIMO transmission is designated in CTS frame 72 as described above, a mechanism may be adopted that adjusts terminals 101 to 103 to have respective data frames with the length or below. A method at terminals 101 to 103 to adjust the length of have the data frames which are to be transmitted can be obtained by referring to the adjusting method used for DL-MU-MIMO transmission in IEEE Std 802.11ac-2013. Thus, the end time of UL-MU-MIMO transmission can be determined. The base station can transmit the acknowledgement response frame SIFS-duration after the end time to terminals having performed UL-MU-MIMO transmission, in this case, terminals 101 to 103.

In this example, the group ID of the group to which terminals 101 to 103 belong is designated. Data frames 73, 74 and 75 are transmitted to base station 100 in a spatial multiplexing manner SIFS-duration after completion of receipt of the CTS frame from terminals 101 to 103. SIFS is an example. Alternatively, any time or IFS may be adopted only if the time is a fixed time. The time may be IFS, which is longer than SIFS. This is applied to the entire present patent application. Likewise, another type of IFS, such as DIFS, may be used for this IFS only if the time is a fixed time. Terminals 101 and 103 have received RTS frame 71 transmitted from terminal 102, and grasps that RTS frame 71 has been transmitted to base station 100 on the basis of the RA field. Consequently, the terminals can determine that CTS frame 72 has been received from base station 100 (no TA field is in CTS frame, as described above). Because of hidden terminals or the like, there is a possibility that terminals 101 and 103 have not received RTS frame 71 yet. In this case, the transmitter of CTS frame 72 can be regarded as base station 100 to which the own terminal is connected. Alternatively, the data frame may not be transmitted. In the RA field of each of data frames 73, 74 and 75, the MAC address of base station 100 is stored. In the TA field of data frames 73, 74 and 75, the MAC address of each terminal is stored. The leading bits ("Individual/Group" ID) of RA field and TA field are "0". In this example, terminal 102 transmits the RTS frame with the TA field set to the MAC address of the own terminal, and subsequently, receives the CTS frame with the set group ID of the group to which the own terminal belongs, but does not receive the CTS frame with the RA field set to the MAC address of the own terminal. Also in this case, terminal 102 is not required to retransmit the RTS frame with the RA field set to the MAC address of the own terminal (that is, retransmission of the RTS frame is cancelled). This determination may be made by MAC/PHY manager 60 and reception processor 40.

Thus, the CTS frame according to this embodiment having the format shown in FIG. 4 is for notifying permission or instruction of UL-MU-MIMO transmission, and also functions as a trigger for determining the start timing of UL-MU-MIMO transmission. The number or length of data frames transmitted from terminals 101 to 103 to base station 100 is predefined in a case of not being notified in the CTS frame as described above, and operation is made according thereto.

Receipt of the RTS frame (see RTS frame 71 in FIG. 3) is herein regarded as a trigger, upon which the CTS frame according to this embodiment having the format shown in FIG. 4 is transmitted by base station 100, thereby allowing permission or instruction of UL-MU-MIMO transmission. The reason thereof is described in detail.

In IEEE Std 802.11-2012, during RTS frame transmission, the length of RTS frame transmission from the own terminal and CTS frame transmission from the destination are considered, and the "Duration" value of the RTS frame is set. The value of "Duration" is used for NAV setting at a terminal other than the destination. Section 9.3.2.4 of IEEE Std 802.11-2012 describes an operation of causing a terminal other than the destination of the RTS frame to reset NAV having being set upon receipt of the RTS frame. More specifically, NAV is reset if CCA cannot be detected (e.g., CCA detection SIFS after CTS frame 72) even after lapse of time of sum of 2×"SIFS" (see SIFSs before and after CTS frame 72 in FIG. 3), transmission time for the CTS frame (the transmission rate of the CTS frame is determined by the transmission rate of the RTS frame) and 2×"SlotTime" from completion of receipt of the RTS frame. "SlotTime" is a time period successful in detecting CCA. A time period twice as long is secured in consideration of a margin.

Consequently, in consideration of a frame sequence with the RTS frame being regarded as a trigger, the control frame using a transmission rate which has the same length as the conventional CTS frame and is uniquely defined on the basis of the RTS transmission rate is required to be transmitted as a response frame for notifying permission or instruction of UL-MU-MIMO transmission and the group ID as a target.

On the other hand, as to a response control frame, such as the CTS frame, ACK frame or BA (BlockAck) frame, the TA field of a frame that activates a response thereof (the RTS frame in a case of CTS frame, the "Data" frame in a case of the ACK frame (including an aggregated case), and the "Data" frame in a case of the BA frame (including an aggregated case)) is copied and used as the RA field of the control frame. The TA field designates the MAC address of the terminal that transmits the frame in normal transmission, that is, the unicast address. Accordingly, the I/G bit is required to set to zero. Consequently, in the response frame activated in response to receipt of the frame that has the I/G bit of the TA field of the response frame is expected to be zero, the I/G bit of the RA field is used to identify whether the group ID is included in the RA field. That is, when the I/G bit of the RA field is one, it can be determined that the group ID is included in the RA field.

The frame using the bandwidth signaling TA in IEEE Std 802.11ac-2013 is the RTS frame (or a control wrapper frame including the RTS frame; the CTS frame is the same), the response frame thereto is the CTS frame. When the bandwidth signaling TA is copied and the copied value is used for the RA field of the CTS frame, the I/G bit is returned from one to zero. That is, also in the response frame activated in response to receipt of the frame using the bandwidth signaling TA, the I/G bit of the RA field is set to zero. Consequently, also according to this point, the JIG bit of the RA field can be used to identify whether the group ID is included in the RA field (whether to be used as a part of the MAC address). Also in this embodiment, when it is determined that a normal response frame without permission or instruction of UL-MU-MIMO transmission is to be transmitted in conformity with the frame using bandwidth signaling TA, and the leading bit of a value copied from the transmitting STA address field of the received frame has a value of one, it is only required that a copied value with the leading bit being changed to zero shall be set in the receiving STA address field of the response frame to the received frame. In this case, reception processor 40 passes, to transmission processor 30, the address with the leading bit being thus changed to zero as information for generating the response frame.

Under such constraints on the RTS frame and the CTS frame, in this embodiment, base station 100 having received the RTS frame from terminal 102 transmits the frame where the RA field of the CTS frame is changed as in FIG. 4(B) (the CTS frame in this embodiment) as a frame for permission or instruction of UL-MU-MIMO transmission using the group ID, to the terminals belonging to the group which is designated by the group ID and to which terminal 102 belongs. The terminals having received the CTS frame determine that the own terminal belongs to the group indicated by the group ID including terminal 102, and performs UL-MU-MIMO transmission. In a more specific operation, upon receipt of the CTS frame, terminals 101 to 103 grasp that the frame type (type and subtype) is "Control" and "CTS", and verifies the leading bit (JIG bit) of the RA field. When the bit is determined to be one, the value of the region (predetermined second region) of third to eighth bits B2 to B7 is extracted as the group ID. It is verified whether the extracted group ID coincides with the group ID of the group to which the own terminal belongs. In a case of coincidence, the data frame is transmitted SIFS after completion of receipt of the CTS frame. As a result, the transmission is UL-MU-MIMO transmission from multiple terminals.

In FIG. 3, base station 100 receives data frames transmitted through UL-MU-MIMO from terminals 101 to 103, carries out of MIMO demodulation of the received signals, separates the signals on a stream-by-stream basis, and obtains the data frames transmitted from the terminals. The TA of the data frame transmitted from each terminal is the MAC address of the corresponding terminal. The leading bit (JIG bit) of the TA is zero. The RA is the MAC address of base station 100. The leading bit (JIG bit) of the RA is zero. It is predefined that the possible value of the leading bit of a MAC address of the terminal (including the base station) is set to zero. The group ID is not necessarily set in the data frame to be transmitted through UL-MU-MIMO to the base station or the physical packet including this frame. Base station 100 determines whether the data frame from each terminal has been successfully received, on the basis of the FCS field of the data frame. Base station 100 generates acknowledgement response frame 76 that stores information on whether the reception of a data frame succeeded or not (ACK information) on each terminal, and transmits acknowledgement response frame 76, SIFS-duration after completion of receipt of UL-MU-MIMO transmission signal.

Also for the acknowledgement response frame, a method of setting the group ID in the RA field can be used. The terminal having transmitted the data frame where the TA field is the MAC address of the own terminal and the RA field is the MAC address of base station 100 expects reception of a unicast response frame in response thereto. That is, the terminal expects reception of the response frame where the RA field is a copy of the TA field of the data frame transmitted by the own terminal. Consequently, the JIG bit of the RA field of the response frame to the data frame transmitted from base station 100 can be used to identify whether the group ID is set in the RA field. That is, when the JIG bit is one, it can be determined that the group ID is set in the RA field. As with the case of CTS frame 72 described above, for example, a predefined pattern may be set in a place in the RA field which is other than the region where the JIG bit and the group ID are designated, or two octets may be used to designate the time during which the data frame in transmission through UL-MU-MIMO occupies the medium, that is the physical packet length for storing the data frame, for example. In a case where terminals 101 to 103 can sequentially transmit the data frames in the same TXOP, designation of the physical packet length for storing the data frame for UL-MU-MIMO transmission in acknowledgement response frame 76 allows the end time of the next UL-MU-MIMO transmission to be determined through provision of a mechanism of adjusting data frames which are to be transmitted so as to have the physical packet length equal to the designated value or not greater than the designated value. The base station can transmit the acknowledgement response frame to the next UL-MU-MIMO transmission SIFS after the end time to the terminals having performed UL-MU-MIMO transmission, i.e., terminals 101 to 103 in this case.

Here, a new frame may be defined as the format of the acknowledgement response frame. Alternatively, a BA (BlockAck) frame may be reused and extended.

In the case of reusing the BA frame, the frame type is "Control" and the frame subtype is "BlockAck" as with the case of a normal BA frame. The frame obtained by thus reusing the BA frame may be referred to as "Multi-Station Block Ack". FIG. 5(A) shows an example of a frame format in the case of reusing the BA frame. FIG. 5(B) shows an exemplary frame format of a BA Control field of the BA frame, and FIG. 5(C) shows an exemplary frame format of a BA Information field of the BA frame. In the case of reusing the BA frame, an indication may be in the BA Control field that the BA frame format is that extended for notifying the acknowledgement response regarding the plural wireless terminals. For example, in IEEE802.11 standard, a case where a Multi-TID subfield is 1 and a Compressed Bitmap subfield is 0 is reserved. This may be used in order to indicate that the BA frame format is extended for notifying the acknowledgement response regarding to plural wireless terminals. Alternatively, an area of bits B3-B8 is a reserved subfield in FIG. 5(B), but all or a part of this area may be defined in order to indicate that the BA frame format is extended for notifying the acknowledgement response regarding to plural wireless terminals.

In the RA field in the BA frame, Group ID signaling RA having the format shown in FIG. 4(B) is stored. Through the "Multi-User" subfield in the "BA Control" field, the number of users (the number of terminals) which are reported in the BA information field is notified. In the BA information field, there are arranged for each user (terminal), a subfield for Association ID (which is depicted as Per TID Info. in FIG. 5(C)), a Block Ack Starting Sequence Control subfield, and a Block Ack Bitmap subfield. The Association ID subfield is set to the AID for identifying the user. The Block Ack Starting Sequence Control subfield has stored therein a sequence number of a first MSDU (medium access control (MAC) service data unit) in acknowledgement response information shown by the Block Ack frame. In the Block Ack Bitmap subfield, a bitmap (Block Ack Bitmap) constituted by bits each showing reception success or failure for the sequence numbers subsequent to the Block Ack Starting Sequence number is set. In the BA frame, a field for permission or instruction of UL-MU-MIMO transmission with the same group ID in the same TXOP may be provided. In the BA Control field, the region of bits B3 to B8 are a reserved subfield in FIG. 5(B). For example, a part of this region may be used as continuation permission or instruction of UL-MU-MIMO transmission with the same group ID in the same TXOP. The field may be provided in a part of the RA field. One bit is sufficient for the information because, for example, the value of one can indicate continuation being enabled while the value of zero can indicate continuation being disabled. Thus, the terminal having received the BA frame can perform UL-MU-MIMO transmission again SIFS after the BA frame in the same TXOP.

In a case where acknowledgement response frame 76 is a reused BA frame, the terminal having received this acknowledgement response frame 76 verifies the "Frame Type" and the "Frame Subtype" of acknowledgement response frame 76. Upon detection of the fact that these are "Control" and "BlockAck", the I/G bit of the RA field is subsequently verified. Because this value is one, it is determined that the RA field stores the Group ID signaling RA having the format shown in FIG. 4(B). The values of the third to eighth bits of the RA field are extracted as the group ID, and the extracted group ID is compared with the group ID of the group to which the own terminal belongs. In a case where the extracted group ID coincides with the group ID of the group to which the own terminal belongs, the ACK information to (one or more) data frames transmitted by the own terminal is determined on the basis of the "Block Ack Bitmap" field, and whether the data frame from the own terminal is successfully transmitted is determined. For example, a "TID Info" subfield that stores "AID" of the own terminal is identified from a "BA Information" field. A value (starting sequence number) set in a "Block Ack Starting Sequence Control" subfield subsequent to the identified "TID Info" subfield is identified. Whether the transmission of each sequence number on and after the starting sequence number is succeeded is identified from a "Block Ack" bitmap. The bit length of "AID" may be shorter than the "TID Info" subfield length. The "AID" is stored in a part of the region of the "TID Info" subfield (e.g., 11 bits (B0 to B10) from the beginning in two octets (16 bits)). In a case where the "BA Control" field indicates the BA frame format is extended in order to notify the acknowledgement response information pertaining to multiple terminals, procedures may be added that detect "Control" and "BlockAck" from the frame type and the frame subtype of the "Frame Control" field of acknowledgement response frame 76, subsequently verify the RA field to determine that the RA field stores the Group ID signaling RA, and verify the "BA Control" field to in turn verify whether the format is the "BA" frame format extended to notify the acknowledgement response information pertaining to the multiple terminals. In this case, when the format is the BA frame format extended to notify the acknowledgement response information pertaining to the multiple terminals, the operation of extracting the group ID from the RA field and the operation thereafter are continued, and when the format is not the BA frame format extended to notify acknowledgement response information pertaining to the multiple terminals, the received frame is determined as an error and processed.

When the ACK frame, instead of the BA frame, is returned to the multiple terminals, one bit in the "TID Info" subfield in each BA information field (e.g., a twelfth bit from the beginning (B11 provided that the beginning is B0) in two octets (16 bits)) may be used as a bit ("ACK/BA" bit) indicating ACK or "BA", and this bit may be set to a value indicating "ACK". In a case where the value indicating "ACK" is set, the "Block Ack Starting Sequence Control" subfield and "Block Ack Bitmap" subfield are omitted. Thus, "ACKs" of the multiple terminals can be notified through one frame.

The example described above describes the case of responding BA or "ACK" by reusing the BA frame. In a case of defining a new frame as the acknowledgement response frame for setting the group ID, the format shown in FIG. 6 may be used instead, for example. The "Frame Type" of the "Frame Control" field is set to "Control", and the subtype is set to a subtype of "Group ID Ack", and a new value is defined. If the subtype is herein set to "ACK" as with the conventional case, there is a possibility that the terminal without supporting Group ID signaling RA has an ACK frame length different from the conventional ACK frame length, and perform processing while regarding the received frame as an error. Consequently, a new value different from "ACK" is required to be defined as the subtype. In the RA field, Group ID signaling RA having the format shown in FIG. 4(B) is set. "Ack" bitmap field stores information (ACK information) indicating whether reception from each terminal is succeeded. The format of "Ack" bitmap field may be any format. For example, a format analogous to the format of "BA Information" field (see FIG. 5(C)) in the case of "BlockAck" may be adopted. The format is not limited thereto. Alternatively, any format may be adopted only if the correspondence relationship between the terminal, the sequence number and ACK information is clear. In a case where the number of data frames transmitted through UL-MU-MIMO is limited to one, information pertaining to the sequence number may be omitted from the acknowledgement response frame. At this time, information designating the order of the terminals belonging to the same group may be preliminarily notified through the management frame, and pieces of ACK information may be arranged one by one for the respective terminals in this order in the "Ack" bitmap field. This negates the need to set information for identifying the terminal (information, such as "AID") in the "Ack" bitmap field. Consequently, there is an advantage of reducing the "Ack" bitmap field length. In this case, the terminal having received the acknowledgement response frame identifies the bit at the position according to the preliminarily notified order of the own terminal through the "Ack" bitmap field, and extracts the ACK information from the identified bit. Also in a case of storing the starting sequence number and the ACK information having each of sequence numbers on and after the starting sequence number as in the example of FIG. 5(C) in "BlockAck", the order of each terminal can be preliminarily designated and the operation can be executed in an analogous manner. That is, the field at the position according to the preliminarily notified order of the own terminal may be identified within the "Ack" bitmap field, the starting sequence number may be identified from the region on the leading side in the identified field, and the ACK information with each sequence number on and after the starting sequence number may be extracted through each bit in the latter region. Here, the information for designating the order of each terminal is preliminarily notified through the management frame. Alternatively, a field for designating the order of each terminal may be added to the acknowledgement response frame in FIG. 6 (e.g., added between the RA field and the "Ack" bitmap field), and each terminal may grasp the order of the own terminal using this field. Also in the new frame, as described in the case of BA frame, information indicating permission or instruction of UL-MU-MIMO transmission with the same group ID in the same TXOP may be provided in the frame. For example, the information may be set as a partial subfield in the RA field used as the Group ID signaling RA.

Figure 7:
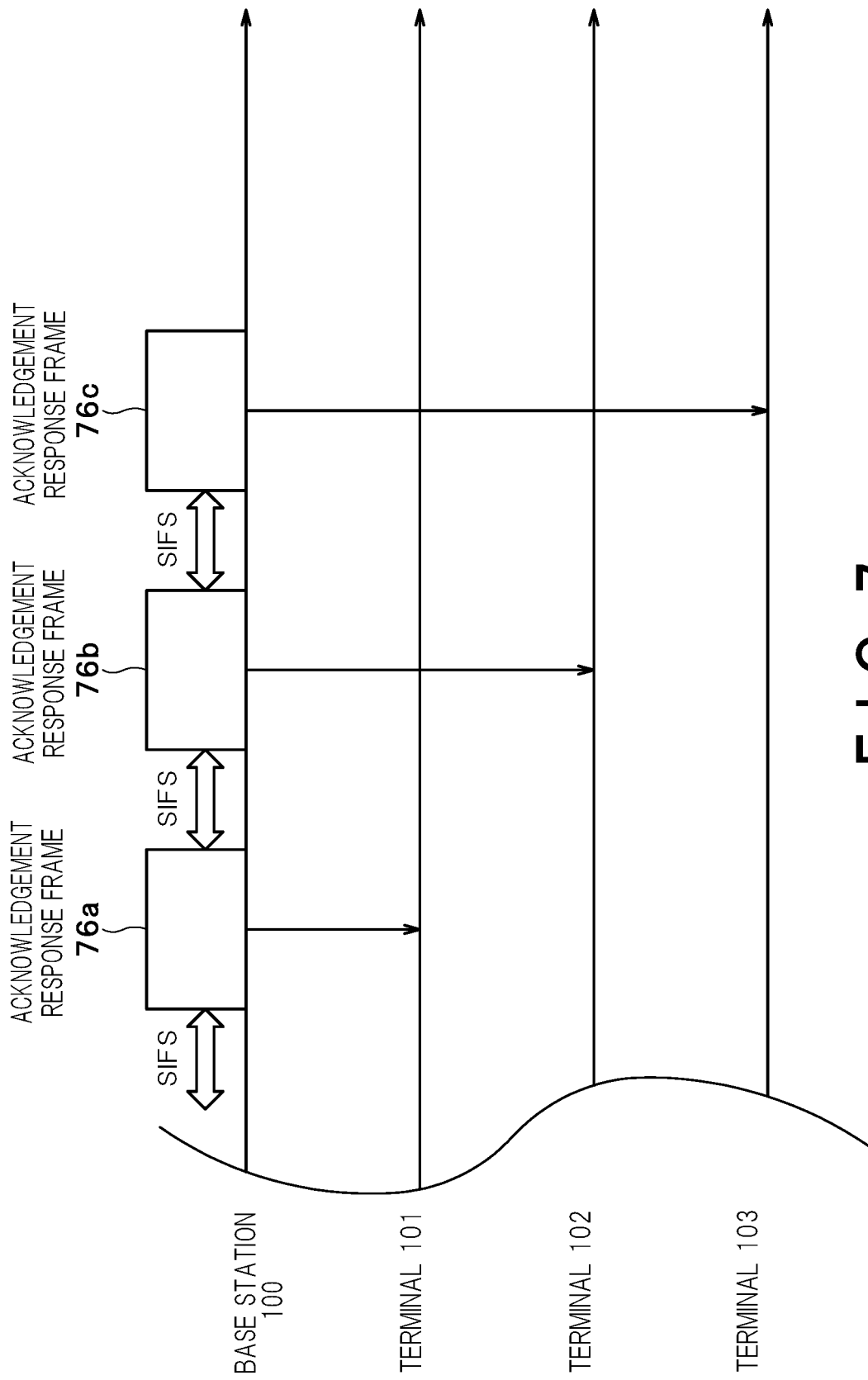
FIG. 7 is a diagram showing an example of a sequence for individually transmitting the acknowledgement response frame to each terminal.

In this embodiment, the group ID and the ACK information for each terminal are stored in a single acknowledgement response frame, and simultaneously transmitted to each terminal. Alternatively, as shown in FIG. 7, acknowledgement response frames 76a, 76b and 76c may be individually generated for the respective terminals, and sequentially transmitted at SIFS intervals. In this case, the acknowledgement response frame may be a publicly known ACK frame or BA frame. The RA field of the individual acknowledgement response frame is only required to be set to the MAC address (I/G bit being zero) of the corresponding terminal.

FIG. 8 is a flowchart of a basic operation example of the base station according to this embodiment.

The base station receives the RTS frame from the terminal in BSS (S101). That is, the frame whose frame type (type and subtype) is "Control" and "RTS" is received. The base station preliminarily manages the group for UL-MU-MIMO transmission. The group to which the terminal having transmitted the RTS frame belongs is identified on the basis of TA of the RTS frame (S102). A CTS frame is generated where the "Individual/Group" bit (I/G bit) is set to one, and the group ID of the identified group is set in the predetermined second region in the RA field (B2 to B7 bits in FIG. 4(B), i.e., the third to eighth bits) (S103). At this time, the frame type (type and subtype) of the "Frame Control" field in the CTS frame is set to values indicating "Control" and "CTS" as with the normal CTS frame. Base station transmits the generated CTS frame SIFS after completion of receipt of the RTS frame (the same S103). As described above, in a strict sense, it is determined whether to transmit permission or instruction of UL-MU-MIMO transmission to the group to which the source terminal of the RTS frame belongs, after S101 and by S103. For example, this determination may be made immediately after S101. Alternatively, on the basis of information held in the base station, determination may be made whether to allow Single-User (SU) transmission only from the source terminal of the RTS frame or allow UL-MU-MIMO transmission from the identified group, after identification of the group in S102. When determination is made to allow "SU" transmission only from the source terminal of the RTS frame, a normal CTS frame is generated and transmitted instead of S103, the data frame only from the source terminal of the RTS frame is received instead of S104 described later, and a conventional acknowledgement response frame is generated and transmitted instead of S105.

The base station receives the data frame subjected to UL-MU-MIMO transmission from the terminals belonging to the group with the group ID notified through the CTS frame, upon lapse of SIFS after completion of transmission of the CTS frame (S104). The base station obtains the signal of each stream by demodulating the received UL-MU-MIMO transmission signal, and decodes the signal, thereby obtaining the data frame of each terminal. The base station determines whether the reception is succeeded on the basis of the FCS information on the data frame, and generates information indicating whether the reception is succeeded (ACK information) (S105). In a case where multiple data frames are received with respect to each terminal, ACK information on each data frame is generated. The base station generates, as the acknowledgement response frame, a response frame where the I/G bit of the RA field is set to one, the group ID is set in the predetermined second region of the RA field (B2 to B7 bits in FIG. 4(B), i.e., the third to eighth bits), and the ACK information for the data frame of each terminal is stored in a predetermined field in conformity with the frame format to be used (the same S105). The base station simultaneously transmits the generated response frames to the respective terminals SIFS after completion of reception of the UL-MU-MIMO transmission signal (the same S105). In a case of continuous permission or instruction of UL-MU-MIMO transmission with the group ID in the same TXOP, S104 and S105 are repeated in the same TXOP.

FIG. 9 is a flowchart of a basic operation example of the terminal according to this embodiment.

When the terminal having data to be transmitted to the base station obtains an access right (transmission right) according to, for example, DIFS and necessity through carrier sensing in a backoff period, the terminal transmits the RTS frame to the base station (S201). The TA address of the RTS frame is the MAC address (I/G bit is zero) of the terminal having obtained the access right. The RA address is the MAC address (UG bit is zero) of the base station. Steps S202 to S208 described later are also applied to terminals other than the terminal having transmitted the RTS frame in step S201.

The terminal receives the CTS frame transmitted from the base station having received the RTS frame (S202). The terminal checks the frame type (type and subtype) on the basis of the "Frame Control" field of the CTS frame, and grasps that the type and subtype are "Control" and "CTS". As the I/G bit (leading bit) of the RA field of this CTS frame is one, it is determined that the group ID is set in the predetermined second region (B2 to B7 bits in FIG. 4(B), i.e., the third to eighth bits) in the RA field, and the group ID is read from the predetermined second region (S203).

The terminal compares the read out group ID with the group ID of the group to which the own terminal belongs (S204). When both the group IDs coincide with each other (YES), it is determined that the terminal belongs to the group having permission or instruction of UL-MU-MIMO transmission from the base station, and it is determined that the data frame is to be transmitted through UL-MU-MIMO to the base station. The terminal generates a data frame to be transmitted to the base station, UL-MU-MIMO transmission is performed to the base station SIFS after completion of receipt of the CTS frame (S205). When the group ID does not coincide (NO), it is determined that the own terminal does not belong to the group having permission or instruction of UL-MU-MIMO transmission from the base station, and transmission is not made.

After transmitting the data frame, the terminal receives the acknowledgement response frame transmitted from the base station (see FIG. 5 or 6). The terminal determines the frame type (type and subtype) on the basis of the "Frame Control" field of the acknowledgement response frame. For example, in a case of the response frame which is a reuse of "BlockAck" in FIG. 5, the frame type (type and subtype) are "Control" and "BlockAck", and the "Individual/Group" ID bit of the RA field is one. In this case, when the terminal grasps the frame type and "Individual/Group" ID bit, the terminal determines that the group ID is set in the predetermined second region (B2 to B7 bits in FIG. 4(B), i.e., the third to eighth bits), and reads the group ID from this region (S206). The terminal compares the read group ID with the group ID of the group to which the own terminal belongs (S207). When both the group IDs coincide with each other (YES), "Block Ack Starting Sequence Control" subfield and "Block Ack Bitmap" subfield corresponding to AID of the own terminal are identified, ACK information on the data frame transmitted by the own terminal is identified from these subfields, and whether the data frame transmission is succeeded is determined on the basis of the ACK information (S208). When both the group IDs do not coincide with each other, it is determined that ACK information on the terminal belonging to another group is stored, and no operation is performed. That is, when both the group IDs do not coincide with each other, it is determined that no acknowledgement response frame has been received and the process is performed. In the case where both the group IDs do not coincide with each other and in the case where it is determined that any data frame transmitted in S108 has been unsuccessful, the data frame to be retransmitted is transmitted in a manner analogous to the case of conventional retransmission process in a case where an opportunity of retransmission to the base station by the own terminal is obtained. This opportunity of retransmission to the base station by the own terminal may be in the same TXOP as that of UL-MU-MIMO transmission in S205. In a case of receipt of continuous permission or instruction of UL-MU-MIMO transmission with the same group ID in the same TXOP, the processing is returned to S205 provided that it is in the same TXOP. In this case, the process of S208 and the process of S205 may be inverted.

In step S206, when the acknowledgement response frame is a newly defined frame as shown in FIG. 6, the frame type (type and subtype) is "Control" and, for example, "Group ID Ack", and the I/G bit of the RA field is one. In this case, when the terminal grasps the frame type and I/G bit, the terminal determines that the group ID is set in the predetermined second region (B2 to B7 bits in FIG. 4(B), i.e., the third to eighth bits), and reads the group ID from this region (S206). This group ID is then compared with the group ID of the group to which the own terminal belongs (S207). In a case of coincidence (YES), the ACK information on the own terminal is identified from "Ack Bitmap" field, and whether the data frame transmission is succeeded is determined on the basis of the ACK information (S208).

As described above, according to this embodiment, when the MAC frame is transmitted that is transmitted upon activation by the MAC frame of unicast from the terminal and is for permission and instruction of UL-MU-MIMO transmission, the I/G bit of the RA field of the MAC frame is set to one, the group ID that is shorter than the MAC address and is defined for multiuser is set in a part of the remaining field region. More specifically, when the RTS frame is received from the terminal, a response is issued with a CTS frame where the I/G bit (leading bit) of the RA field is set to "1", and the group ID of the group to which the terminal belongs is set in the predetermined second region (the third to eighth bits) of the RA field. This negates the possibility that the value of the RA field of the CTS frame coincides with the MAC address of the terminal in the BSS or the MAC address of a terminal which may participate in the BSS in the future. Consequently, the group ID can be set in the RA field without specifically causing any problem. Furthermore, through use of the existing RTS-CTS framework, UL-MU-MIMO transmission can be achieved, the frame for permission or instruction of UL-MU-MIMO transmission is not necessarily required to be newly defined.

The terminal having received the CTS frame determines that the frame type (type and subtype) is "Control" and "CTS" from the "Frame Control" field. Based on the fact that the I/G bit of the RA field is one, it can be grasped that the CTS frame is for permission or instruction of UL-MU-MIMO transmission, and the group ID is in the predetermined field in the RA field. The terminal reads out the group ID from the RA field. When the terminal belongs to a group which coincides with the read out group ID, UL-MU-MIMO transmission is performed at predetermined timing. In a normal case, the JIG bit (leading bit) of the RA field is zero when the frame type (type and subtype) is "Control" and "CTS". This is because the value in the TA field of the RTS frame is copied and set in the RA field of the CTS frame in a normal case. However, in the CTS frame according to this embodiment, the JIG bit of the RA field is set to one. Consequently, the terminal having received the CTS frame can identify that this CTS frame is a frame for permission or instruction of UL-MU-MIMO transmission, and the group ID is set in the RA field.

According to this embodiment, when an acknowledgement response frame (a frame divertedly using the BA frame, a newly defined frame or the like) which serves as a response to UL-MU-MIMO transmission from multiple terminals is transmitted, the JIG bit of the RA field in the acknowledgement response frame may be set to one, and the group ID may be set in a part of the remaining field region. This negates the possibility that the value of the RA field of the acknowledgement response frame coincides with the MAC address of the terminal in the BSS or the MAC address of a terminal which may participate in the BSS in the future. Consequently, the group ID can be set in the RA field without specifically causing any problem.

The terminal having received the acknowledgement response frame determines that the frame type (type and subtype) is "Control" and "BlockAck" (or, for example, a type of the acknowledgement response frame as with "Group ID Ack") from the "Frame Control" field. Based on the fact that the JIG bit of the RA field is one, it can be grasped that the acknowledgement response frame is a frame that stores ACK information for UL-MU-MIMO transmission, and the group ID is set in the predetermined second region in the RA field. The terminal then reads out the group ID from the predetermined second region of the RA field. When the own terminal belongs to the read out group coinciding with the group ID, the ACK information on the own terminal is identified from the acknowledgement response frame according to a predetermined method, and whether data frame transmission is succeeded is determined. According to the system or specifications, only a case where the RA field of the acknowledgement response frame is permitted to be set to the broadcast address or multicast address (in this case, the JIG bit is one), and a case where it can be confirmed that the value of the RA field does not coincide with the broadcast address or the multicast address, it may be determined that the group ID is set in the predetermined second region.

Figure 20:
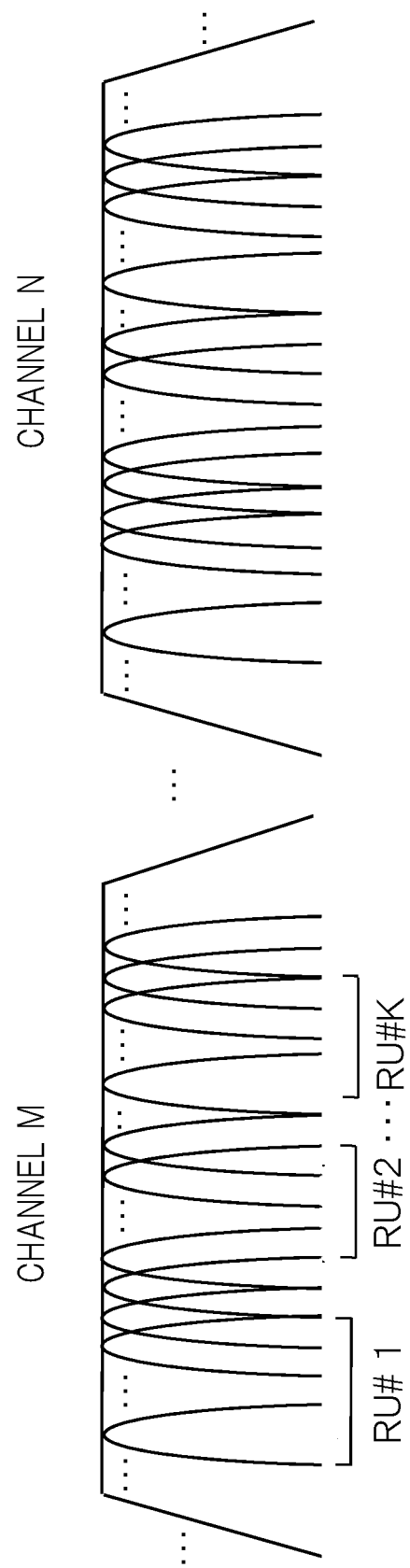
FIG. 20 is a diagram for illustrating resource unit assignment to each terminal in an uplink OFDMA.

In this embodiment, the description has been made with reference to the case of UL-MU-MIMO transmission. Alternatively, the description may be applied to uplink OFDMA (Orthogonal Frequency Division Multiple Access). The uplink OFDMA (UL-OFDMA) is a communication scheme that assigns the terminal one or more subcarriers as a resource unit, which may be also referred to as a subchannel, a resource block, frequency block or the like, and simultaneously performs reception from multiple terminals on a resource unit basis. The resource unit is a frequency component that is the minimum unit of the resource for communication. The resource unit is a frequency component that is the minimum unit of the resource for communication. FIG. 20 shows resource units (RU #1, RU #2, . . . , RU #K) secured in a continuous frequency domain in one channel (here, described as channel M). In channel M, multiple subcarriers orthogonal to each other are arranged. Multiple resource units including one or more continuous subcarriers are defined in channel M. Between the resource units, one or more subcarriers (guard subcarriers) may be arranged. However, the guard subcarriers are not necessary. Each subcarrier in the channel may be assigned a number for identifying the subcarrier. The bandwidth of one channel may be, for example, 20, 40, 80, 160 MHz or the like. However, the bandwidth is not limited thereto. Multiple channels at 20 MHz may be combined into one channel. The number of subcarriers or the number of resource units in the channel may be different according to the bandwidth. Multiple terminals' simultaneous use of resource units different from each other can achieve uplink OFDMA. Note that the resource unit may be a channel at 20 MHz, and the resource unit may be assigned to each terminal in units of channels of 20 MHz. In the case of UL-MU-MIMO, each terminal is separated according the stream. Alternatively, in the case of uplink OFDMA (UL-OFDMA), the configuration may be replaced with a configuration where each terminal is separated according to the resource unit instead of the stream. Referring to the description pertaining to the UL-MU-MIMO transmission in this embodiment, a certain terminal transmits the RTS frame and the base station transmits the CTS frame of the Group ID signaling RA in response thereto, which allows UL-OFDMA transmission by multiple terminals conforming to the group ID. Application of Group ID signaling RA also to the acknowledgement response frame after UL-OFDMA transmission enables the acknowledgement response to the multiple terminals having performed UL-OFDMA transmission to be issued in one frame in a combined manner. Such replacement of UL-MU-MIMO with UL-OFDMA is applicable also to embodiments described later.

Second Embodiment

In this embodiment, the base station sets the I/G bit to one, and transmits a CTS frame including an RA field where the group ID is set in a predetermined second region (a CTS frame where Group ID signaling RA is set), thereby preliminarily notifying downlink multiuser MIMO transmission of downlink multiuser MIMO transmission (notification that the terminals are targets of downlink multiuser MIMO transmission) to the terminals in the group. SIFS after transmission of the CTS frame, the base station transmits a data frame to the terminals in the group through downlink multiuser MIMO transmission. In this embodiment, with diverted use of "CTS-To-Self", the base station transmits the CTS frame without using the RTS frame from the terminal as a trigger. According to a normal "CTS-To-Self", when the CTS frame is transmitted from the base station, the MAC address (with an I/G bit of zero) is set in the RA field. However, according to this embodiment, instead of the MAC address of the base station, "Group ID signaling RA" (the I/G bit is one, and the predetermined second region is set to the group ID) is set in the RA field of the CTS frame.

FIG. 10 shows an example of an operation sequence of base station 100 and terminals 106 to 108 shown in FIG. 2. Base station 100 has data to be transmitted to terminals 106 to 108. A sequence of DL-MU-MIMO transmission of the data to terminals 106 to 108 is described. It is assumed that terminals 106 to 108 are preliminarily combined by base station 100 into a group for DL-MU-MIMO transmission and the group ID is notified from base station 100 to these terminals.

It is assumed that base station 100 detects that a medium is busy as a result of observing the medium in order to transmit data frame, carrier-sensing is performed during, for example, DIFS and a randomly determined backoff duration subsequent thereto, and a carrier-sensing result is obtained as an idle access right. In this case, base station 100 generates and transmits CTS frame 81 in order to cause the terminals in BSS to set NAV. CTS frame 81 has the same format as the CTS frame shown in FIG. 4 described in the first embodiment. That is, the predetermined first region in the RA field, more specifically, the leading bit (I/G bit), is set to one. The predetermined second region (the third to eighth bits) is set to the group ID of the group to which terminals 106 to 108 belong. The other region in the RA field is configured as a reserved field. Alternatively, a predefined pattern may be set in a part of or the entire other region in the RA field. As to the usages of the first embodiment and this embodiment, in a case of using a CTS frame through use of Group ID signaling RA, in order to discriminate the usages from each other, the CTS frame in the first embodiment for permission or instruction of UL-MU-MIMO transmission may be configured such that a part of another region except the first and second regions in the RA field indicates that the frame is the CTS frame in this embodiment representing a preliminary notification on UL-MU-MIMO transmission. In this case, provided that the information has one bit, the value of zero can indicate, for example, permission or instruction of UL-MU-MIMO transmission, while the value of one can indicate an advance notice of UL-MU-MIMO transmission. Thus, one bit can be considered sufficient. Note that because of the CTS frame, the frame contains no TA field.

This CTS frame 81 is received by the terminals in BSS that includes terminals 106 to 108. The terminal having received CTS frame 81 verifies the frame type (type and subtype) on the basis of the "Frame Control" field of CTS frame 81, and grasps the type and subtype are "Control" and "CTS". The terminal then verifies the leading bit (JIG bit), and grasps the value of the bit is one. Because the JIG bit is one, it is determined that the value of the RA field is not the MAC address of the own terminal, and NAV is set according to the value set in the "Duration" field. As the JIG bit is one, it is determined that the group ID is set in the predetermined second region (the third to eighth bits) in the RA field. The group ID is extracted from the predetermined second region. Terminals 106 to 108 compare the read group ID with the group ID of the group to which the own terminals belong. Because of coincidence between both IDs, the terminals determine that DL-MU-MIMO transmission is to be made to the own terminals from base station 100 SIFS after completion of transmission of CTS frame 81, and wait for reception. However, there is a possibility that the terminal receives the CTS frame having the format in FIG. 4 from another base station adjacent thereto. In this case, the CTS frame has no TA field. Consequently, it cannot be discriminated whether the frame is a CTS frame from the base station to which the own terminal is connected or a CTS frame from another base station to which the own terminal is not connected, only through the above description. With respect to the CTS frame from the other base station without connection, it is determined that DL-MU-MIMO transmission to the own terminal is to be made SIFS after the reception, and reception is waited. Between base stations adjacent to each other, the group IDs may be preliminarily assigned to the respective groups in each BSS so as to prevent overlapping. This method may be a method of statically setting the range of the group IDs preliminarily assignable to each base station. Alternatively, a communication path for control may be formed wiredly or wirelessly between base stations, exchange of information pertaining to the group ID through the communication path may prevent the group IDs from overlapping. In the wireless case, the group ID used or scheduled to be used in the own BSS is notified through a beacon frame or probe response frame. Upon receipt of such a frame, another base station uses a value other than the notified group ID as the group ID in the BSS including the other base station. Likewise, if the other base stations also notify the group IDs used or scheduled to be used in the respective BSSs including the other base stations, the group IDs assigned by the respective base stations can be prevented from overlapping with each other. Alternatively, the predefined pattern may be set in the CTS frame, and the pattern may be configured not to be overlap between the own BSS and the adjacent BSSs, thereby allowing the CTS frame to be discriminated by the terminal. To obtain a method of preventing the patterns assigned by the respective base stations from overlap with each other in the case where the CTS frame is discriminated using the pattern, the method of preventing group ID overlapping is to be referred to. Alternatively, a part of information on BSSID (in the case of an infrastructure BSS, the identifier is equivalent to the MAC address of the base station forming this BSS), for example, the last nine bits, may be processed and set in the header of a physical packet, and the terminal may discriminate the CTS frame according to whether the BSSID related information in the header portion of the physical packet coincides with that of the own BSS. Alternatively, the CTS frame may be discriminated on the basis of the combination of patterns of the BSSID related information and the pattern in the CTS frame of the Group ID signaling RA.

As described above, typically, when the CTS frame is transmitted from the base station without receipt of the RTS frame from the terminal (in the case of "CTS-To-Self"), the MAC address of base station 100 (the JIG bit is zero) is set in the RA field. However, this embodiment is characterized in that what has the JIG bit set to one instead of the MAC address of base station 100, and the predetermined second region set to the group ID is stored as the RA address.

Upon lapse of SIFS after completion of transmission of CTS frame 81, base station 100 transmits, to terminals 106 to 108 in the group designated by CTS frame 81, data frames destined to the respective terminals, through DL-MU-MIMO transmission (these data frames are collectively denoted by 82). At this time, in conformity with IEEE Std 802.11ac standards, the group ID may be set in the header (VHT-SIG-A field) of the physical packet to be transmitted to each terminal. Terminals 106 to 108 wait for receipt of the signal transmitted through DL-MU-MIMO from base station 100, and applies MIMO demodulation to the received signal, thereby extracting the data frame destined to the own terminal. Each terminal may decode the data frame only when the group ID included in the header of a physical packet coincides with the group ID of the group to which the own terminal belongs. Each terminal determines whether the reception is successfully made on the basis of the FCS information on the data frame, and generates acknowledgement response frames 83, 84 and 85 indicating the determination result of whether the reception is succeeded (ACK information). Upon lapse of SIFS after completion of receipt of the MIMO signal from base station 100, terminals 106 to 108 transmit acknowledgement response frames 83 to 85 to base station 100 through UL-MU-MIMO. The formats of acknowledgement response frames 83 to 85 may be normal ACK frames or BA frames. Here, acknowledgement response frames 83 to 85 are transmitted through UL-MU-MIMO. Alternatively, as shown in FIG. 11, terminals 106 to 108 may sequentially transmit acknowledgement response frame 83a, 84a and 85a at intervals of SIFSs. It is only required that the order of outputting the acknowledgement response frames is preliminarily notified from base station 100 to terminals in each group through management frames on a group-by-group basis. Alternatively, with reference to IEEE Std 802.11ac-2013, an A-MPDU configuration may be used for the data frame destined to terminal 106 without including "BlockAckRequest" (BAR) frame, and terminal 106 may be prompted to transmit the acknowledgement response frame (this method is referred to as implicit BAR), implicit BAR is not applied to the data frames destined to terminals 107 and 108, and as a result, the acknowledgement response frame may be received from terminal 106 SIFS after completion of transmission of data frame 82, and the BlockAckRequest frame may be transmitted to terminal 107 SIFS after completion of receipt of the acknowledgement response frame from terminal 106 (this method is referred to as explicit BAR), and as a result, the acknowledgement response frame may be received from terminal 107 SIFS after completion of transmission of BlockAckRequest frame destined to terminal 107, the BlockAckRequest frame may be transmitted to terminal 108 SIFS after completion of reception of the acknowledgement response frame from terminal 107, and as a result, the acknowledgement response frame may be received from terminal 108 SIFS after completion of transmission of the BlockAckRequest frame destined to terminal 108.

As described above, according to this embodiment, the base station transmits the CTS frame where the Group ID signaling RA is set, thereby allowing the terminals in the group having the group ID to be notified that the terminals are targets of downlink multiuser MIMO transmission, using the CTS frame.

Third Embodiment

In the first embodiment, reception of the RTS frame is used as the trigger of transmission of the CTS frame for notifying permission or designation of uplink multiuser MIMO transmission by the base station. Alternatively, in this embodiment, the base station transmits the CTS frame without receipt of the RTS frame from the terminal. Because the transmission of the RTS frame is negated, UL-MU-MIMO transmission can be started at high speed.

FIG. 12 shows an example of an operation sequence of base station 100 and terminals 101 to 103 shown in FIG. 2. Terminals 101 to 103 have data to be transmitted to base station 100. A sequence of UL-MU-MIMO transmission of the data to base station 100 is described. It is assumed that terminals 101 to 103 are preliminarily combined by base station 100 into a group for UL-MU-MIMO transmission and the group ID is notified to these terminals.

It is assumed that base station 100 detects that a medium is busy as a result of observing the medium in order to transmit data frame, carrier-sensing is performed during, for example, DIFS and a randomly determined backoff duration subsequent thereto, and a carrier-sensing result is obtained as an idle access right. At this time, base station 100 generates and transmits CTS frame 91 having the same format as that shown in FIG. 4 described in the first embodiment. That is, the leading bit (I/G bit) of the RA field of CTS frame 91 is one. The predetermined second region (the third to eighth bits) in the RA field are set to the group ID of the group to which terminals 101 to 103 belong. The other region in the RA field is configured as a reserved field. Alternatively, a predefined pattern may be set in a part of or the entire other region in the RA field. Note that because of the CTS frame, the frame contains no TA field.

This CTS frame 91 is received by the terminals in BSS that includes terminals 101 to 103. Each terminal having received CTS frame 91 verifies the frame type (type and subtype) on the basis of the "Frame Control" field of CTS frame 91, and grasps the type and subtype are "Control" and "CTS". The terminal then verifies the leading bit (I/G bit) of the RA field, and grasps the value of the bit is one. As the I/G bit is one, it is determined that the group ID is set in the predetermined second region in the RA field. The group ID is extracted from the predetermined second region. The terminal compares the read group ID with the group ID of the group to which the own terminal belongs. The terminals other than terminals 101 to 103 determine that the own terminals are not designated as the targets of UL-MU-MIMO transmission because the both IDs do not coincide with each other. Meanwhile, terminals 101 to 103 determine that the terminals are designated as the targets of UL-MU-MIMO transmission because both the IDs coincide with each other. Terminals 101 to 103 transmit data frames 92, 93 and 94 to base station 100 through UL-MU-MIMO transmission SIFS after completion of receipt of CTS frame 91. TAs of data frames 92, 93 and 94 are the MAC addresses (the I/G bit is zero) of terminals 101 to 103. RA is the MAC address of base station 100 (the I/G bit is zero). In this operation, upon receipt of CTS frame 91, terminals 101 to 103 regard that this CTS frame 91 is received from the base station to which the own terminals are connected. It can thus be determined that the destination of the data frame is this base station even without presence of TA field in CTS frame 91. Consequently, UL-MU-MIMO transmission can be achieved. However, there is a possibility that the terminal receives the CTS frame having the format in FIG. 4 from another base station adjacent thereto. In this case, the CTS frame has no TA field. Consequently, it cannot be discriminated whether the frame is a CTS frame from the base station to which the own terminal is connected or a CTS frame from another base station to which the own terminal is not connected, only through the above description. The data frame is transmitted to the other base station without connection. Between base stations adjacent to each other, the group IDs may be preliminarily assigned to the respective groups in each BSS so as to prevent overlapping. This method may be a method of statically setting the range of the group IDs preliminarily assignable to each base station. Alternatively, a communication path for control may be formed wiredly or wirelessly between base stations, exchange of information pertaining to the group ID through the communication path may prevent the group IDs to be assigned from overlapping. In the wireless case, the group ID used or scheduled to be used in the own BSS is notified through a beacon frame or probe response frame. Upon receipt of such a frame, the other base station uses a value other than the notified group ID as the group ID in the BSS including the other base station. Likewise, if the other base stations also notify the group IDs used or scheduled to be used in the respective BSSs including the other base stations, the group IDs assigned by the respective base stations can be prevented from overlapping with each other. Alternatively, the predefined pattern may be set in the CTS frame, and the pattern may be configured not to be overlap between the own BSS and the adjacent BSSs, thereby allowing the CTS frame to be discriminated by the terminal. To obtain a method of preventing the patterns assigned by the respective base stations from overlap with each other in the case where the CTS frame is discriminated using the pattern, the method of preventing group ID overlapping is to be referred to. Alternatively, a part of information on BSSID (in the case of an infrastructure BSS, the identifier is equivalent to the MAC address of the base station forming this BSS), for example, the last nine bits, may be processed and set in the header of a physical packet, and the terminal may discriminate the CTS frame according to whether the BSSID related information in the header portion of the physical packet coincides with that of the own BSS. Alternatively, the CTS frame may be discriminated on the basis of the combination of patterns of the BSSID related information and the pattern in the CTS frame of the Group ID signaling RA.

The sequence thereafter is analogous to that in FIG. 3 in the first embodiment. That is, base station 100 applies MIMO demodulation to the signals of data frames transmitted through UL-MU-MIMO from terminals 101 to 103, separates the signals on a stream-by-stream basis, and obtains the data frames of the terminals. TA of the data frame transmitted from each terminal is the MAC address of the corresponding terminal ("Individual/Group" field is zero), and RA is the MAC address of base station 100 ("Individual/Group" field is zero). Base station 100 determines whether the data frame from each terminal has been successfully received, on the basis of the FCS information in the FCS field of the data frame. Base station 100 generates acknowledgement response frame 95 that stores information on whether the reception of a data frame succeeded or not (ACK information) on reception of the data frame of each terminal, and transmits acknowledgement response frame 95, upon lapse of SIFS after completion of receipt of the UL-MU-MIMO transmission signal. Also for acknowledgement response frame 95, a method of setting the group ID in the RA field can be used. The detailed description thereof is the same as those described in the first embodiment. Consequently, the description is omitted.

As described above, according to this embodiment, the CTS frame where the JIG bit is set to one and the group ID is set is transmitted from the base station without using receipt of the RTS frame from the terminal as a trigger. Consequently, in addition to the advantageous effects of the first embodiment, as the transmission of the RTS frame is negated, UL-MU-MIMO transmission can be started at high speed.

Variation examples based on the embodiments described above are illustrated. In the above description, the JIG bit of the RA field is set to one, and the group ID is set in the predetermined second region in the RA field. Alternatively, in the following variation examples, modes without setting the group ID are described. The modes or technical idea described in the variation examples are applicable to each embodiment described above.

First Variation Example

In the first embodiment, in response to the RTS frame, the CTS frame whose JIG bit is set to one and which includes the RA field with the group ID being set in the predetermined second region is transmitted, thereby issuing permission or instruction of uplink multiplexed transmission (UL-MU-MIMO transmission or UL-OFDMA transmission) to the terminals in the group. In this case, the uplink multiplexed transmission is performed in a limited manner only to the terminals belonging to the group with the group ID designated by the CTS frame. Alternatively, a method without limitation to the terminals belonging to this group may be adopted.

More specifically, in response to the RTS frame, the base station transmits the CTS frame where the JIG bit of the RA field is set to one. The region of the RA field other than the JIG bit may have any value, or set to a predetermined value (bit pattern). Thus, the base station instructs any terminal to perform uplink multiplexed transmission. Upon receipt of the CTS frame transmitted from the base station, the terminal having transmitted the RTS frame and another terminal having received the RTS frame (except the base station) can determine permission or instruction of uplink multiplexed transmission because the JIG bit is one according to the reason described in the first embodiment.

The terminal freely determines whether to perform uplink transmission according to the reason whether the terminal has data to be uplink-transmitted. In the case of UL-OFDMA, upon determination to perform uplink transmission, the terminal selects a resource unit from among resource units according to a predetermined method, and uplink-transmits the data frame through the selected resource unit a predetermined time, such as of SIFS, after receipt of the CTS frame. In the case of UL-MU-MIMO, the terminal may select a spatial resource from among spatial resources (multiple preambles having a relationship orthogonal to each other with respect to space, time or frequency) according to a predetermined method, and uplink-transmit the data frame through the selected spatial resource a predetermined time, such as of SIFS, after receipt of the CTS frame.

The spatial resource is described. In the case of UL-MU-MIMO, instead of the method of the base station performing reception using uplink channel responses preliminarily obtained from multiple terminals, the following method may be adopted. That is, the base station can grasp the uplink channel responses of the respective terminals using the preambles orthogonal to each other by adding the preambles to the leading sides (in the physical headers) of the frames transmitted from the respective terminals, and decode the parts after the preambles on the basis of the grasped channel responses. Any of methods with respect to time, frequency and code may be used as the method of orthogonalizing the preambles between the terminals. In a case of temporal orthogonalization, the preamble field is divided into multiple sections, and the terminals transmit the preamble data in the sections different from each other. In a certain section, only any one terminal transmits the preamble data. That is, the temporal positions for transmitting the preamble data are different between the terminals. A duration during which a certain terminal transmits the preamble data is a duration during which the other terminals transmit nothing. In a case of temporal orthogonalization, the preamble contains not only the preamble data to be transmitted but also information pertaining the time on which transmission is performed. In a case of frequency orthogonalization, the terminals transmit the preamble data at frequencies orthogonal to each other. In a case of frequency orthogonalization, the preamble contains not only the preamble data to be transmitted but also information pertaining the frequency (subcarrier) where transmission is performed. In a case of encoding orthogonalization, the terminals transmit the preamble data where multiple values (symbols corresponding to the respective values) contained in rows of an orthogonal matrix different from each other (or columns different from each other). The rows (or the columns) of the orthogonal matrix are in a relationship of being orthogonal to each other. Any of the orthogonalization methods can identify the preamble in each terminal at access point 11.

When the same resource (resource unit or spatial resource) is selected by multiple terminals, the base station fails in decoding the data frames transmitted from these terminals. However, on the resources where terminal selection does not overlap, the base station decodes data frames normally transmitted through these resources, thereby achieving uplink multiplexed transmission (UL-MU-MIMO transmission or UL-OFDMA transmission). It may be pre-determined whether the uplink multiplexed transmission is UL-MU-MIMO or UL-OFDMA. Alternatively, a region for designating one of the schemes may be provided in the RA field of the CTS frame, and information designating the scheme may be set in the region by the base station.

As another operation example, a method may be adopted that causes the base station to transmit a trigger frame for uplink multiplexed transmission instead of the CTS frame for the RTS frame. In this case, the JIG bit of the RA field in the trigger frame is set to one. Upon receipt of the frame transmitted from the base station, the terminal having transmitted the RTS frame and another terminal having received the RTS frame (except the base station) can determine that the received frame is the trigger frame because the JIG bit is one. The fact that the frame is the trigger frame is notified through setting the JIG bit to one. Consequently, existing values may be divertedly used as the values of the type and subtype of "Frame Control" field. The trigger frame may have a configuration with any format. A field for setting information that identifies multiple usable resources may be provided in the trigger frame, and a terminal that has received the trigger frame and determines to perform uplink transmission may select a resource to be used from among the resources designated by the field. As with the case of the CTS frame, a region for designating one between UL-MU-MIMO and UL-OFDMA may be provided in the trigger frame, and information designating the scheme may be set in this region by the base station (this is also applicable to other variation examples and embodiments described later). Alternatively, information designating multiple terminals to which permission or instruction of uplink multiplexed transmission is issued may be included in the trigger frame, and only terminals designated by the information may be allowed to perform uplink multiplexed transmission.

Second Variation Example

"Multi-Station Block Ack" described with reference to FIG. 5(A) to (C) may be used as the acknowledgement response to the multiple data frames transmitted through uplink multiplexed transmission from the multiple terminals in the first variation example. At this time, the JIG bit of the RA field may be set to one, and the other region in the RA field may be set to any value or a predetermined value (bit pattern). Note that the bit string of the RA field does not coincide with the broadcast address or the multicast address. Alternatively, in the other region, one terminal among the terminals having performed uplink multiplexed transmission may be selected, and an address part that is of the address of the selected terminal and is other than the JIG bit may be set. The selected terminal may be randomly selected. Alternatively, in a case where the terminal having exchanged the RTS frame and the CTS frame with the base station is performing uplink transmission, this terminal may be selected.

Upon receipt of the frame where the JIG bit of the RA field is one and the type and subtype of the "Frame Control" field are "Control" and "BlockAck", the terminal having performed uplink transmission recognizes this frame as "Multi-Station Block Ack". The case of setting a predetermined bit pattern or the address part of the terminal in the other region described above may require a condition that the bit pattern or the address part is set. In the case of requiring the condition that the address part is set, the terminal having performed uplink transmission stores the address of the terminal or the like having transmitted the RTS frame, when receiving the RTS frame.

The configuration of "Multi-Station Block Ack" described in this variation example may be used in the first embodiment. That is, in the first embodiment, the group ID is set in the predetermined second region in the RA field. Alternatively, the format of the RA field as with this variation example may be used without setting the group ID.

Third Variation Example

In the first variation example, in response to receipt of the CTS frame as the trigger, the multiple terminals transmit the data frames that contain data to be transmitted, through uplink multiplexed transmission (UL-MU-MIMO transmission or UL-OFDMA transmission). Alternatively, instead of transmission of the data, a request for uplink multiplexed transmission (i.e., notification that the data to be transmitted is held) may be transmitted. That is, as shown in FIG. 13, in response to RTS frame 71, the base station transmits CTS frame 400 where the JIG bit of the RA field is set to one in order to identify the terminal waiting for a request of uplink transmission. Upon receipt of CTS frame 400 transmitted from the base station, the terminal having transmitted RTS frame 71 and another terminal having received this RTS frame (here, including at least terminals 102 and 103) confirm that the JIG bit is one, and transmits predefined frames for notifying a request (request frames) 401 to 403 in a case of having a request for uplink transmission. The frame may be "Null Data Packet" (NDP). The frame transmission at this time may be UL-MU-MIMO transmission or UL-OFDMA transmission (transmission by a method analogous to that of the first variation example). Alternatively, the frame may be transmitted through unicast on CSMA/CA basis. In the case of CSMA/CA basis, a limitation on a time period for accepting a request for uplink transmission may be provided and acceptance may be available only in this time period. Alternatively, acceptance may be finished at the time by which requests issued by a predetermined number of terminals have been accepted. As terminal 102 has transmitted RTS frame 71, this terminal does not necessarily transmit request frame 402. Even if the base station does not receive request frame 402 from terminal 102, the base station may interpret that terminal 102 has a request for uplink transmission. As the JIG bit of the RA field in the CTS frame 400 is one, terminal 102 can interpret that the request for uplink transmission issued by the own terminal has reached the base station. In a region of the RA field other than the JIG bit in CTS frame 400, information on a resource usable for request frame transmission (resource unit or spatial resource) may be set. Terminals 101 to 103 may transmit the request frame through the resource selected by a predetermined method, such as random selection, from among the resources designated by the information.

The base station may select the terminal that is to perform uplink multiplexed transmission from among terminals having notified a request for uplink transmission, and transmit trigger frame 404 to the selected terminal. Any format may be determined as the format of trigger frame 404. The values of type and subtype of "Frame Control" field may be newly defined for the trigger frame. The broadcast address or multicast address may be set in the RA field. Alternatively, any format that is not provided with the RA field may be adopted. The trigger frame may be provided with a field for setting information that identifies the resource used for uplink transmission for each selected terminal. Each terminal may use the resource designated by this field. The trigger frame may be transmitted a predetermined time, such as of SIFS, after receipt of the request frame. Alternatively, the access right may be obtained on a CSMA/CA basis and trigger frame 404 may be transmitted. The terminals having received trigger frame 404 and been selected (here, terminals 101 and 102) transmit data frames 405 and 406 through uplink multiplexed transmission (UL-MU-MIMO transmission or UL-OFDMA transmission) a predetermined time, such as of SIFS, after receipt of trigger frame 404. Subsequently, the base station may transmit the acknowledgement response frame in a manner analogous to that of the second variation example.

In this variation example, with respect to RTS frame 71 transmitted by terminal 102, the base station transmits CTS frame 400. However, the frame to be transmitted is not limited to the CTS frame. For example, a trigger frame may be transmitted. In this case, the terminal having received RTS frame 71 and also received the trigger frame transmits a request frame when having a request for uplink transmission.

Fourth Variation Example

The second embodiment assumes that when transmitting DL-MU-MIMO transmission, the base station preliminarily obtains the downlink channel response. Alternatively, to obtain downlink channel responses from multiple terminals, the multiple terminals may transmit the downlink channel responses to the base station through UL-OFDMA or UL-MU-MIMO. To obtain the downlink channel responses from multiple terminals, frame 411 for sounding is transmitted as shown in FIG. 14. "Null Data Packet" (NDP) may be used as this frame. NDP is a physical packet with no data field (i.e., with no MAC header either). In a case where the base station has multiple antennas, NDP signals may be simultaneously transmitted from these antennas. Before transmission of NDP, a frame serving as a trigger of NDP transmission (corresponding to the RTS frame in the first variation example), such as the RTS frame from any terminal, may be received, and NDP may be transmitted in response to the receipt. The terminal having transmitted the frame and the terminal having received the frame may determine acquisition of the channel response and feedback, by receiving NDP in response to the frame.

Terminals 101 to 103 having received this NDP estimate the channel on the basis of NDP, obtain the downlink channel responses, and transmit frames 411 to 413 that contain the obtained channel responses through uplink multiplexed transmission (UL-OFDMA or UL-MU-MIMO) a predetermined time, such as SIFS, after receipt of NDP. The method of uplink multiplexed transmission may be a method analogous to that of the first variation example. The type of the frame may be a management frame or a data frame. As an example, the transmitting STA address of this frame is the own terminal, and a receiving STA address or a receiver address is the base station. The multiple terminals replying the channel responses may be terminals having preliminarily received notification that downlink transmission is scheduled from the base station, or all the terminal having received NDP. Alternatively, the own terminals may randomly determine whether to reply the channel response. When two or more terminals transmit through the same resource, the base station cannot normally decode the frames from these terminals.

The base station receives the frames transmitted through uplink multiplexed transmission from the multiple terminals, and obtains the downlink channel responses with respect to the terminals having succeeded in normal decoding. The base station identifies the terminals having transmitted the successfully decoded frames, generates and transmits acknowledgement response frame 411 that integrally contains ACKs to the identified terminals. At this time, "Multi-Station Block Ack" described above is used as acknowledgement response frame 414. The I/G bit in the RA field may be set to one, while the other region may be set to any value or a predetermined value (bit pattern). In a case of presence of the terminal having transmitted the frame (corresponding to the RTS frame in the first variation example) serving as a trigger of transmitting frame 411 for sounding, the address part that is of the terminal and is other than the I/G bit may be set.

As described in the first embodiment, when ACK, instead of BA frame, is returned to the multiple terminals using "Multi-Station Block Ack", one bit in the "TID Info" subfield in each BA information field (e.g., a twelfth bit (B11 provided that the beginning is B0))) may be used as a bit ("ACK/BA" bit) indicating whether ACK or "BA", and this bit may be set to a value indicating "ACK". In this case, the "Block Ack Starting Sequence Control" subfield and "Block Ack Bitmap" subfield may be omitted. Thus, "ACKs" of the multiple terminals can be notified through one frame.

The multiple terminals having performed uplink multiplexed transmission receive acknowledgement response frame 414, determine that this frame is "Multi-Station Block Ack" because the I/G bit is one, and determine whether the transmission has been successfully made according to presence or absence of the "TID Info" subfield that contains AID of the own terminal. Setting of the I/G bit to one allows the existing BA frame to be divertedly used (i.e., without newly defining the frame type and subtype or defining a new frame format), and "Multi-Station Block Ack" can be achieved. The case of setting a predetermined bit pattern or the address part of the terminal in the other region described above may require a condition that the bit pattern or the address part is set.

In the example described above, the base station transmits the frame for sounding, and obtains downlink channel responses from the multiple terminals through an uplink-multiplexed manner. Alternatively, other information may be obtained through the uplink-multiplexed manner, and the acknowledgement response frame that integrally contains ACKs in response thereto may be transmitted. For example, when the base station intends to grasp information on the resource unit which multiple terminals wish to use in UL-OFDMA, the base station may transmit a frame that requests transmission of the information, and the multiple terminals having received the frame may transmit the frame that contains the information through uplink multiplexed transmission (UL-OFDMA or UL-MU-MIMO). In a case of using UL-OFDMA for uplink multiplexed transmission at this time, any resource unit may be used. In a case where a resource unit has been preliminarily designated, the designated resource unit may be used. The base station receives the frames transmitted through uplink multiplexed transmission from the multiple terminals, and obtains the information with respect to the terminals having succeeded in normal decoding. Likewise, the base station identifies the terminals having transmitted the successfully decoded frames, generates the acknowledgement response frame that integrally contains ACKs, and transmits he frame to the identified terminals. Subsequently, when the base station transmits the CTS frame or trigger frame having been described above and starts UL-OFDMA, the base station may designate the resource unit used by each terminal in UL-OFDMA on the basis of the obtained information.

Fourth Embodiment

Figure 15:
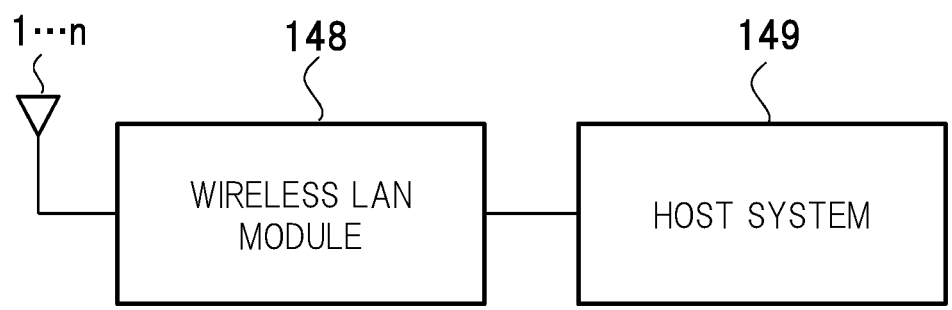
FIG. 15 is an overall configuration diagram of the terminal and the base station according to an embodiment of the present invention.

FIG. 15 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, and so on.

Figure 16:
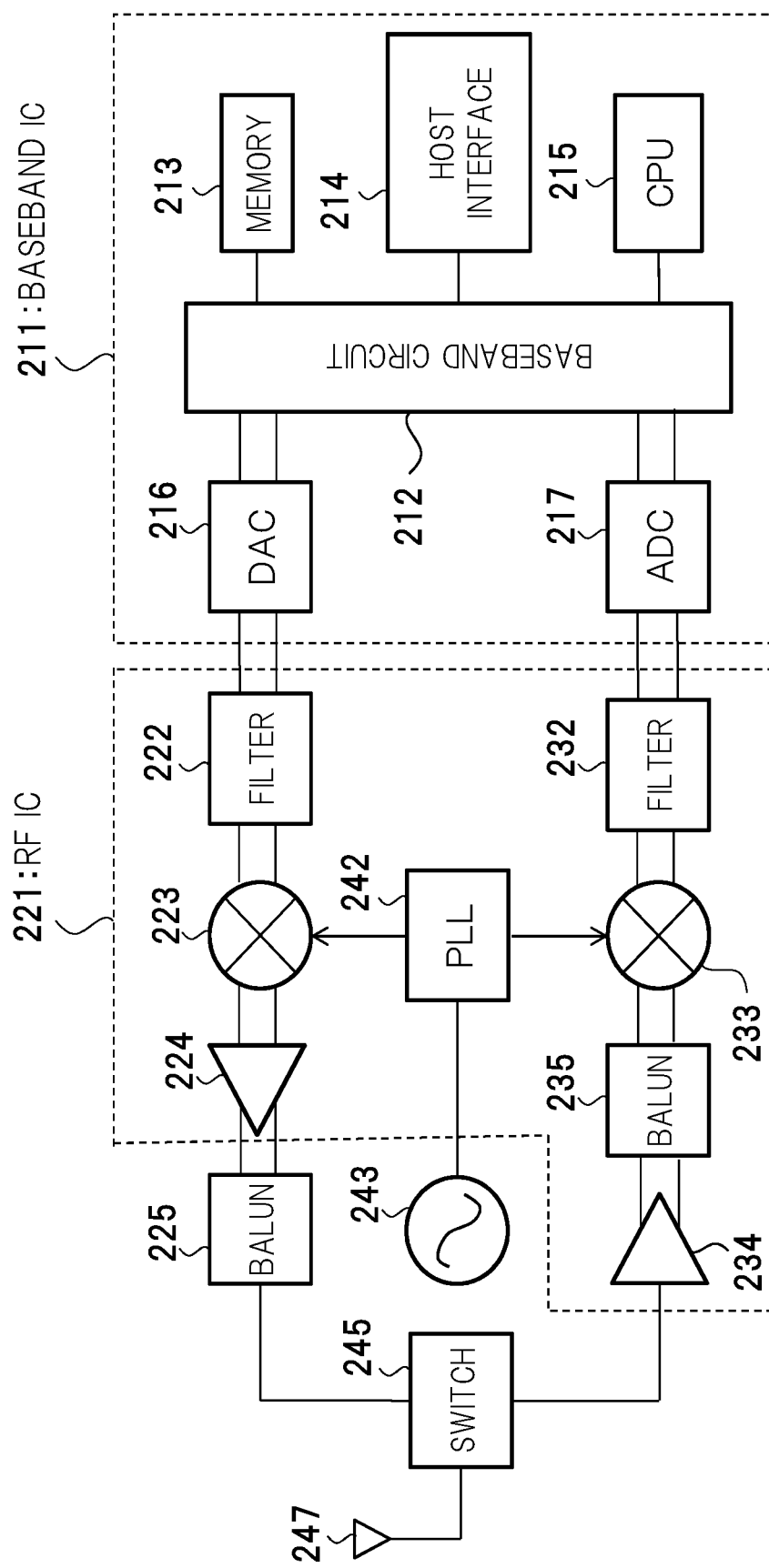
FIG. 16 is a hardware block diagram of the wireless communication device according to a an embodiment of the present invention.

FIG. 16 shows an example of hardware configuration of a wireless LAN module. The configuration can also be applied when the wireless communication device is mounted on either one of the terminal that is a non-base station and the base station. Therefore, the configuration can be applied as an example of specific configuration of the wireless communication device shown in FIG. 1. At least one antenna 247 is included in the example of configuration; however, two or more antennas may be included. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The detail explanation of each block is omitted because it is apparent from explanation of FIG. 1.

Fifth Embodiment

Figure 17:
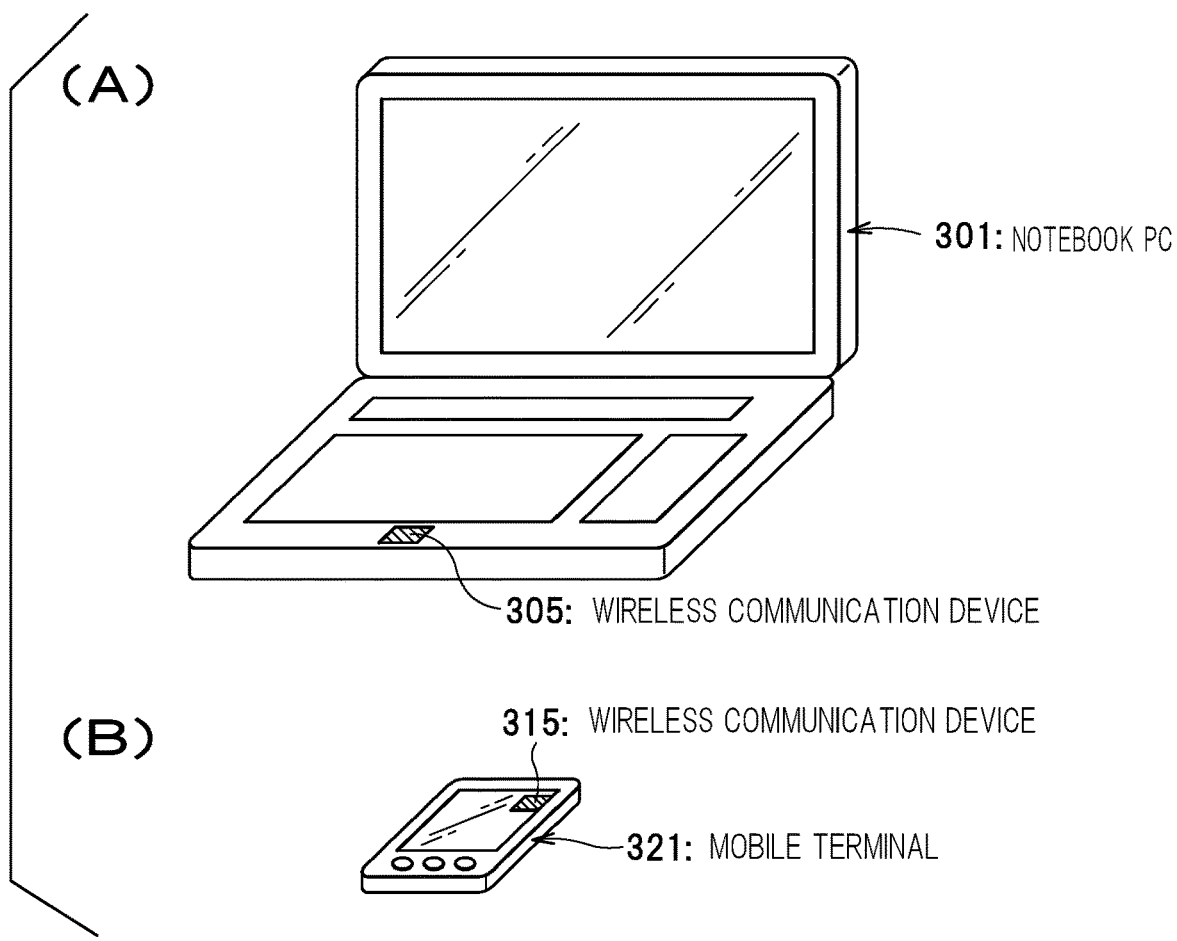
FIG. 17 is a perspective view of a wireless device according to an embodiment of the present invention.

FIG. 17(A) and FIG. 17(B) are perspective views of wireless terminal according to the fourth embodiment. The wireless terminal in FIG. 17(A) is a notebook PC 301 and the wireless communication device (or a wireless device) in FIG. 17(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone and so on.

Figure 18:
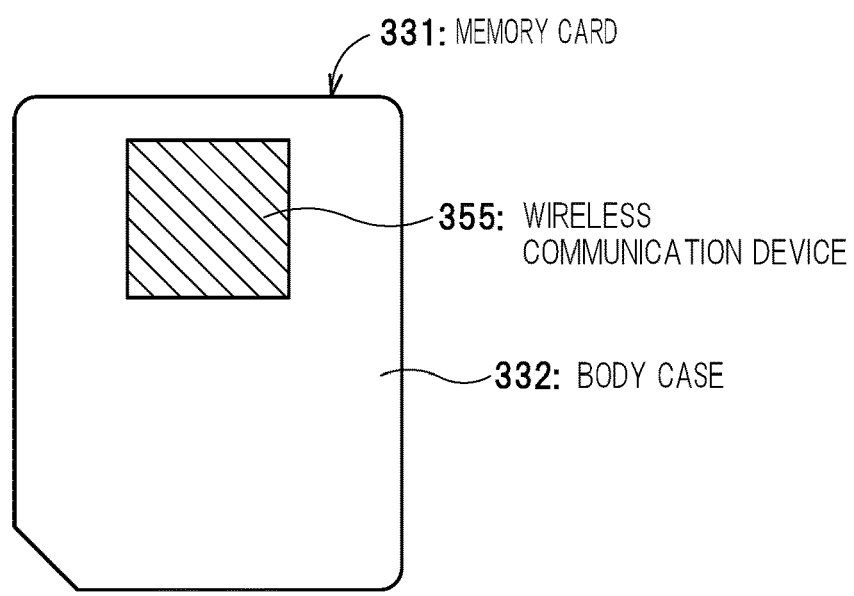
FIG. 18 is a diagram showing a memory card according to an embodiment of the present invention.

Moreover, a wireless communication device installed in a terminal (which may indicate a base station) can also be provided in a memory card. FIG. 18 illustrates an example of a wireless communication device mounted on a memory card. A memory card 331 contains a wireless communication device 355 and a body case 332. The memory card 331 uses the wireless communication device 355 for wireless communication with external devices. Here, in FIG. 18, the description of other installed elements (for example, a memory, and so on) in the memory card 331 is omitted.

Sixth Embodiment

In the sixth embodiment, a bus, a processor unit and an external interface unit are provided in addition to the configuration of the wireless communication device according to any of the first to fifth embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware.

Seventh Embodiment

In the seventh embodiment, a clock generating unit is provided in addition to the configuration of the wireless communication device according to any of the first to fifth embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Eighth Embodiment

In the eighth embodiment, a power source unit, a power source controlling unit and a wireless power feeding unit are included in addition to the configuration of the wireless communication device according to any of the first to fifth embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Ninth Embodiment

In the ninth embodiment, a SIM card is added to the configuration of the wireless communication device according to the eighth embodiment. For example, the SIM card is connected with the MAC processor 10, the MAC/PHY manager 60 or the controller in the wireless communication device. Thus, by adopting a configuration in which the SIM card is included in the wireless communication device, authentication processing can be easily performed.

Tenth Embodiment

In the tenth embodiment, a video image compressing/decompressing unit is added to the configuration of the wireless communication device according to the sixth embodiment. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Eleventh Embodiment

In the eleventh embodiment, an LED unit is added to the configuration of the wireless communication device according to any of the first to fifth embodiments. For example, the LED unit is connected to at least one of the MAC processor 10, the MAC/PHY manager 60, the transmission processing circuit, the reception processing circuit or the controller. Thus, by adopting a configuration in which the LED unit is included in the wireless communication device, notifying the operation state of the wireless communication device to the user can be easily done.

Twelfth Embodiment

In the twelfth embodiment, a vibrator unit is included in addition to the configuration of the wireless communication device according to any of the first to fifth embodiments. For example, the vibrator unit is connected to at least one of the MAC processor 10, the MAC/PHY manager 60, the transmission processing circuit, the reception processing circuit or the controller 112. Thus, by adopting a configuration in which the vibrator unit is included in the wireless communication device, notifying the operation state of the wireless communication device to the user can be easily done.

Thirteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of IEEE802.11 wireless LAN is described. There are six types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Here, FIG. 19 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slottime, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS. In the present embodiment, a wireless communication system using parameters at such interframe spaces is assumed to be an interfering system with a wide communication range.

The frames multiplexing-transmitted by the plurality of terminals may be the same (for example, the same type or the same content) or may be different. Generally, when it is expressed that the plurality of terminals transmits X-th frames or the base station receives X-th frames, the X-th frames may be the same or may be different.

In an uplink multiplexed transmission from a plurality of terminals to the base station, a combined scheme of MU-MIMO (Multiple-Input Multiple-Output) and OFDMA (which is called OFDMA&MU-MIMO) can be employed instead of UL-MU-MIMO or UL-OFDMA. In OFDMA&MU-MIMO, a plurality of terminals employs same resource unit and performs MU-MIMO transmission for each of resource units. In the above-stated each embodiment and each variation example, OFDMA&MU-MIMO may be employed as UL-multiplexed transmission.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An access point in a wireless network, comprising:
one or more memories; and
one or more processors coupled to the one or more memories, the one or more processors configured to:
receive multiple frames from multiple wireless communication terminals, each of the wireless communication terminals having a distinct association identifier (AID);
generate a block acknowledgement (BA) frame to acknowledge the multiple frames, wherein the BA frame comprises a BA information field that has a variable length and includes one or more information subfields being generated by repeating an information subfield format for each traffic identifier (TID) of each distinct wireless communication terminal AID associated with the BA frame; and
transmit the BA frame to the multiple wireless communication terminals,
wherein the information subfield format comprises a Per-TID information subfield, a BA starting sequence control subfield, and a BA bitmap subfield, wherein the Per-TID information subfield comprises an association identifier (AID) subfield, an ACK type subfield, and a TID subfield, wherein an AID in the AID subfield is associated with a wireless communication terminal that is intended to receive a corresponding information subfield,
wherein the Per-TID information subfield is 2 octets in length, wherein the AID subfield is 11 bits in length, the ACK type subfield is 1 bit in length, and the TID subfield is 4 bits in length.

2. The access point of claim 1, wherein the BA frame further comprises a BA control field that indicates if the BA frame is to provide acknowledgement responses to the multiple wireless communication terminals.

3. The access point of claim 1, wherein the BA starting sequence control subfield and the BA bitmap subfield are present when the ACK type subfield indicates block acknowledgement, and the BA starting sequence control subfield and the BA bitmap subfield are omitted when the ACK type subfield indicates acknowledgement.

4. The access point of claim 1, wherein the one or more processors are configured to simultaneously receive the multiple frames from the multiple wireless communication terminals.

5. The access point of claim 1, wherein the one or more processors are further configured to:
transmit a trigger frame of uplink multi-user transmission to the multiple wireless communication terminals; and
simultaneously receive the multiple frames frame from the multiple wireless communication terminals in response to the trigger frame, wherein the multiple frames comprise information requesting acknowledgment response.

6. A wireless communication terminal in a wireless network, comprising:
one or more memories; and
one or more processors coupled to the one or more memories, the one or more processors configured to:
transmit a frame to an access point, wherein the frame is transmitted, to the access point, with at least one other frame from at least one other wireless communication terminal having a distinct association identifier (AID);
receive a block acknowledgement (BA) frame to acknowledge the frame, wherein the BA frame comprises a BA information field that has a variable length and includes one or more information subfields being generated by repeating an information subfield format for each traffic identifier (TID) of each distinct wireless communication terminal AID associated with the BA frame; and examine the BA information field to determine if the frame has been successfully received by the access point, wherein the information subfield format comprises a Per-TID information subfield, a BA starting sequence control subfield, and a BA bitmap subfield, wherein the Per-TID information subfield comprises an association identifier (AID) subfield, an ACK type subfield, and a TID subfield, wherein an AID in the AID subfield is associated with the wireless communication terminal that is intended to receive a corresponding information subfield, wherein the Per-TID information subfield is 2 octets in length, wherein the AID subfield is 11 bits in length, the ACK type subfield is 1 bit in length, and the TID subfield is 4 bits in length.

7. The wireless communication terminal of claim 6, wherein the BA frame further comprises a BA control field that indicates if the BA frame is to provide acknowledgement responses to multiple wireless communication terminals.

8. The wireless communication terminal of claim 6, wherein the BA starting sequence control subfield and the BA bitmap subfield are present when the ACK type subfield indicates block acknowledgement, and the BA starting sequence control subfield and the BA bitmap subfield are omitted when the ACK type subfield indicates acknowledgement.

9. The wireless communication terminal of claim 6, wherein the one or more processors are further configured to:
receive a trigger frame of uplink multi-user transmission from the access point; and
simultaneously transmit the frame, to the access point, with at least one other frame from at least one other wireless communication terminal in response to the trigger frame.

10. The wireless communication terminal of claim 6, wherein the frame comprises information requesting acknowledgment response to the frame.

11. A method for facilitating wireless communication in a wireless communication terminal, comprising:
transmitting a frame to an access point from the wireless communication terminal, wherein the frame is transmitted, to the access point, with at least one other frame from at least one other wireless communication terminal, wherein the wireless communication terminal and each other wireless communication terminal have a distinct association identifier (AID); and receiving a block acknowledgement (BA) frame to acknowledge the frame, wherein the BA frame comprises a BA information field that has a variable length and includes one or more information subfields being generated by repeating an information subfield format for each traffic identifier (TID) of each distinct wireless communication terminal AID associated with the BA frame; and examining the BA information field to determine if the frame has been successfully received by the access point, wherein the information subfield format comprises a Per-TID information subfield, a BA starting sequence control subfield, and a BA bitmap subfield, wherein the Per-TID information subfield comprises an association identifier (AID) subfield, an ACK type subfield, and a TID subfield, wherein an AID in the AID subfield is associated with the wireless communication terminal that is intended to receive a corresponding information subfield, wherein the Per-TID information subfield is 2 octets in length, wherein the AID subfield is 11 bits in length, the ACK type subfield is 1 bit in length, and the TID subfield is 4 bits in length.

12. The method of claim 11, wherein the BA frame further comprises a BA control field that indicates if the BA frame is to provide acknowledgement responses to multiple wireless communication terminals.

13. The method of claim 11, wherein the BA starting sequence control subfield and the BA bitmap subfield are present when the ACK type subfield indicates block acknowledgement, and the BA starting sequence control subfield and the BA bitmap subfield are omitted when the ACK type subfield indicates acknowledgement.

14. The method of claim 11, further comprising:
receiving a trigger frame of uplink multi-user transmission from the access point; and
simultaneously transmitting the frame, to the access point, with at least one other frame from at least one other wireless communication terminal in response to the trigger frame, wherein the frame comprises information requesting acknowledgment response to the frame.

* * * * *